US012114056B2

(12) United States Patent
Stein et al.

(10) Patent No.: US 12,114,056 B2
(45) Date of Patent: *Oct. 8, 2024

(54) CROSS FIELD OF VIEW FOR AUTONOMOUS VEHICLE SYSTEMS

(71) Applicant: MOBILEYE VISION TECHNOLOGIES LTD., Jerusalem (IL)

(72) Inventors: Gideon Stein, Jerusalem (IL); Ori Eytan, Jerusalem (IL); Efim Belman, Jerusalem (IL); Moshe Katiee, Har Gilo (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 16 days.

This patent is subject to a terminal disclaimer.

(21) Appl. No.: 17/811,735

(22) Filed: Jul. 11, 2022

(65) Prior Publication Data

US 2022/0360693 A1 Nov. 10, 2022

Related U.S. Application Data

(63) Continuation of application No. 16/611,667, filed as application No. PCT/US2018/032087 on May 10, 2018, now Pat. No. 11,463,610.
(Continued)

(51) Int. Cl.
*H04N 23/54* (2023.01)
*H04N 23/51* (2023.01)
(Continued)

(52) U.S. Cl.
CPC ............ *H04N 23/54* (2023.01); *H04N 23/51* (2023.01); *H04N 23/57* (2023.01); *H04N 23/90* (2023.01)

(58) Field of Classification Search
None
See application file for complete search history.

(56) References Cited

U.S. PATENT DOCUMENTS

| 5,574,497 A | 11/1996 | Henderson et al. |
| 5,937,212 A | 8/1999 | Kurahashi et al. |

(Continued)

FOREIGN PATENT DOCUMENTS

| DE | 10 2014209782 | 11/2015 |
| JP | 2004-201489 A | 11/2003 |

(Continued)

OTHER PUBLICATIONS

Notice of Reasons for Refusal for Japanese Patent Application No. 2019-553322 date of drafting Jan. 10, 2023, and translation (10 pgs).

(Continued)

*Primary Examiner* — Quan Pham
(74) *Attorney, Agent, or Firm* — FINNEGAN, HENDERSON, FARABOW, GARRETT & DUNNER LLP

(57) ABSTRACT

An imaging system is provided for a vehicle. In one implementation, the imaging system includes an imaging module, a first camera coupled to the imaging module, a second camera coupled to the imaging module, and a mounting assembly configured to attach the imaging module to the vehicle such that the first and second camera face outward with respect to the vehicle. The first camera has a first field of view and a first optical axis, and the second camera has a second field of view and a second optical axis. The first optical axis crosses the second optical axis in at least one crossing point of a crossing plane. The first camera is focused a first horizontal distance beyond the crossing point of the crossing plane and the second camera is focused a (Continued)

second horizontal distance beyond the crossing point of the crossing plane.

24 Claims, 32 Drawing Sheets

Related U.S. Application Data

(60) Provisional application No. 62/504,504, filed on May 10, 2017.

(51) Int. Cl.
*H04N 23/57* (2023.01)
*H04N 23/90* (2023.01)

(56) References Cited

U.S. PATENT DOCUMENTS

| | | | |
|---|---|---|---|
| 8,553,088 | B2 | 10/2013 | Stein et al. |
| 9,185,360 | B2 | 11/2015 | Stein et al. |
| 2004/0114038 | A1 | 6/2004 | Louis |
| 2007/0188653 | A1 | 8/2007 | Pollock et al. |
| 2007/0216768 | A1 | 9/2007 | Smith et al. |
| 2010/0295855 | A1 | 11/2010 | Sasakawa et al. |
| 2012/0268599 | A1 | 10/2012 | Schmidt et al. |
| 2013/0013185 | A1 | 1/2013 | Smitherman et al. |
| 2014/0300738 | A1 | 10/2014 | Mueller |
| 2016/0031372 | A1 | 2/2016 | Stein et al. |
| 2016/0055385 | A1* | 2/2016 | Kapach ............... G06V 10/751 382/104 |
| 2016/0088280 | A1 | 3/2016 | Sadi et al. |
| 2016/0291150 | A1* | 10/2016 | Hara ..................... G01S 17/931 |
| 2016/0371550 | A1 | 12/2016 | Springer |
| 2017/0242442 | A1* | 8/2017 | Minster ................. G06V 20/56 |

FOREIGN PATENT DOCUMENTS

| | | | |
|---|---|---|---|
| JP | 2015-532714 | A | 11/2015 |
| JP | 2016-143308 | A | 8/2016 |
| KR | 20100002231 | A | 1/2010 |

OTHER PUBLICATIONS

Chinese Office Action dated Jun. 21, 2021, for corresponding Chinese Application No. 201880030715.8 (10 pgs) and translation (13 pgs).

International Search Report and Written Opinion, mailed Nov. 19, 2018, in International Application No. PCT/US2018/032087. (19 pags).

Notice of Preliminary Rejection by the Korean Intellectual Property Office (KIPO), dated Sep. 22, 2022, for corresponding Korean Application No. 10-2019-7035954 (5 pgs) and translation (6 pgs).

Japanese Patent Office Notice of Reasons for Refusal for counterpart J.P. Patent Application No. 2019-553322, dated Jun. 13, 2022 (3 pgs) and Translation (6 pgs).

Office Action for Chinese Patent Application No. 201880030715.8, from the China National Intellectual Property Administration of the People's Republic of China, issued Jan. 9, 2023, and translation. (7 pgs).

* cited by examiner

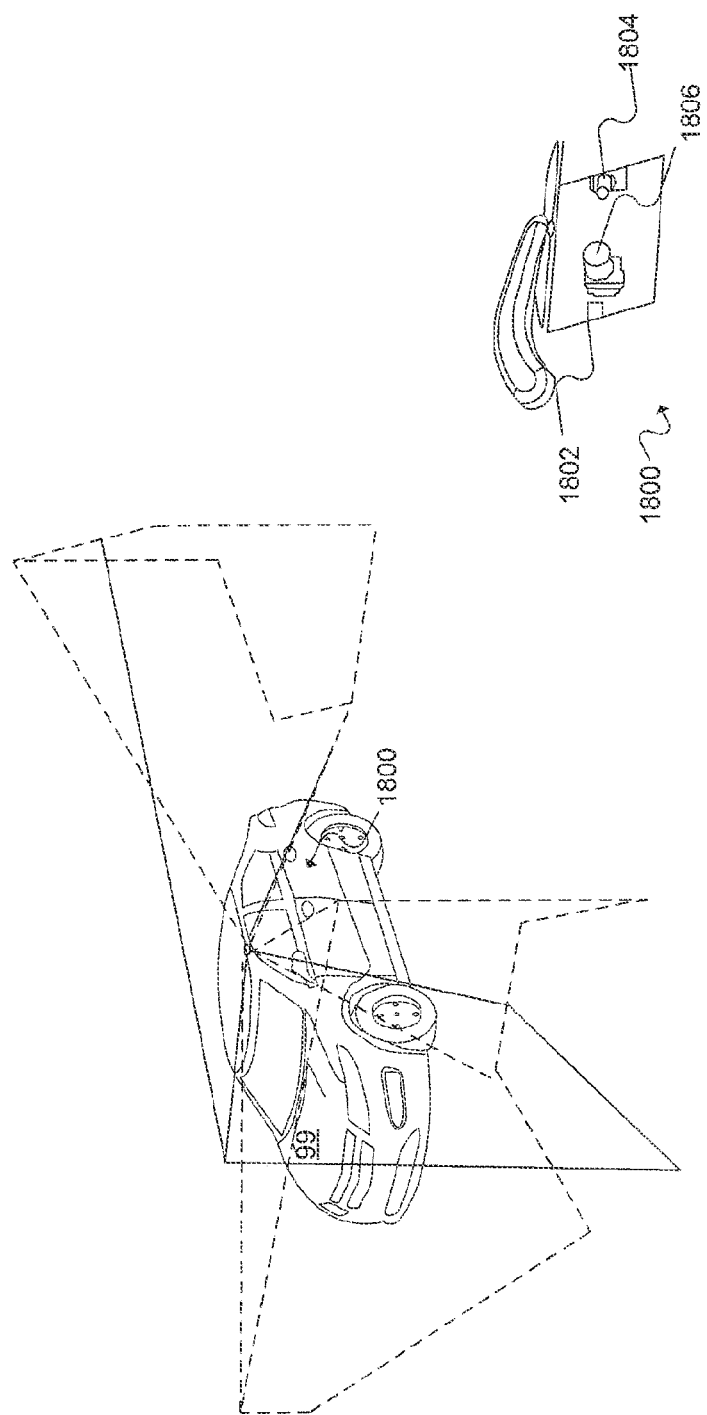

CROSS FIELD OF VIEW FOR AUTONOMOUS VEHICLE SYSTEMS

CROSS REFERENCE TO RELATED APPLICATION

This application is a continuation of U.S. application Ser. No. 16/611,667, filed Nov. 7, 2019, which is a National Stage Entry of International Application No PCT/US2018/032087, filed May 10, 2018, which is based on and claims the benefit of priority of U.S. Provisional Patent Application No. 62/504,504, filed on May 10, 2017. The foregoing applications are incorporated herein by reference in their entireties.

BACKGROUND

Technical Field

The present disclosure relates generally to camera systems for autonomous vehicles. In another aspect, the present disclosure relates generally to camera systems having a cross field of view.

Background Information

Autonomous vehicles may need to account for a variety of factors and make appropriate decisions based on those factors to safely and accurately reach an intended destination. For example, to navigate to a destination, an autonomous vehicle may also need to identify its location within a roadway (e.g., a specific lane within a multi-lane road), navigate alongside other vehicles, avoid obstacles and pedestrians, observe traffic signals and signs, and travel from one road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. For example, as part of the collected data, an autonomous vehicle may need to process and interpret visual information (e.g., information captured from a multitude of cameras located at discrete locations on the vehicle). Each camera may have a particular field of view. In instances in which multiple cameras are used together, the field of view of the cameras may, in some circumstances, overlap and/or be redundant.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, three, or more cameras that monitor the environment of a vehicle. The field of view of each camera may overlap with another camera or even cameras. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

In one embodiment, an imaging system is provided for a vehicle. The imaging system may include an imaging module and a first camera coupled to the imaging module. The first camera may have a first field of view and a first optical axis. The imaging system may also include a second camera coupled to the imaging module. The second camera may have a second field of view and a second optical axis. The imaging system may also include a mounting assembly configured to attach the imaging module to the vehicle such that the first and second camera face outward with respect to the vehicle. Additionally, the first optical axis may cross the second optical axis in at least one crossing point of a crossing plane. Furthermore, the first camera may be focused a first horizontal distance beyond the crossing point of the crossing plane and the second camera may be focused a second horizontal distance beyond the crossing point of the crossing plane; and the first field of view and second field of view may form a combined field of view.

In one embodiment, an imaging system is provided for a vehicle. The imaging system may include an imaging module and a first camera coupled to the imaging module. The first camera may have a first field of view and a first optical axis. The imaging system may also include a second camera coupled to the imaging module. The second camera may have a second field of view and a second optical axis. The imaging system may also include a third camera coupled to the imaging module. The third camera may have a third field of view and a third optical axis. The imaging system may also include a mounting assembly configured to attach the imaging module to an interior window of the vehicle such that the first camera, the second camera, and the third camera face outward with respect to the vehicle. Additionally, the first optical axis may cross the second optical axis in at least one first crossing point of a first crossing plane, the first optical axis may cross the third optical axis in at least one second crossing point of a second crossing plane, and the second optical axis may cross the third optical axis in at least one third crossing point of a third crossing plane. Furthermore, the first field of view, second field of view, and third field of view may form a combined field of view.

In one embodiment, an imaging system is provided for a vehicle. The imaging system may include an imaging module configured to arrange a plurality of cameras along an arc of a semi-circle. The plurality of cameras may be oriented toward a radius of the semi-circle. The imaging system may also include a mounting assembly configured to attach the imaging module to an interior window of the vehicle such that the plurality of cameras face outward with respect to the vehicle. Additionally, each respective camera of the plurality of cameras may have a respective field of view and a respective optical axis that project outward of a single relatively small and transparent opening. Furthermore, each respective field of view overlaps, at least partially, with the radius of the semi-circle and the radius of the semi-circle is located at a central location of the single relatively small and transparent opening. Further still, each respective optical axis crosses every other respective optical axis in at least one respective crossing point of a respective crossing plane, and all of the respective field of views form a combined field of view.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 17 is a perspective view representation of another exemplary imaging system having a combined field of view consistent with the disclosed embodiments.

FIG. 18 is a perspective view representation of the imaging system of FIG. 17 consistent with the disclosed embodiments.

DETAILED DESCRIPTION

Figure 1:
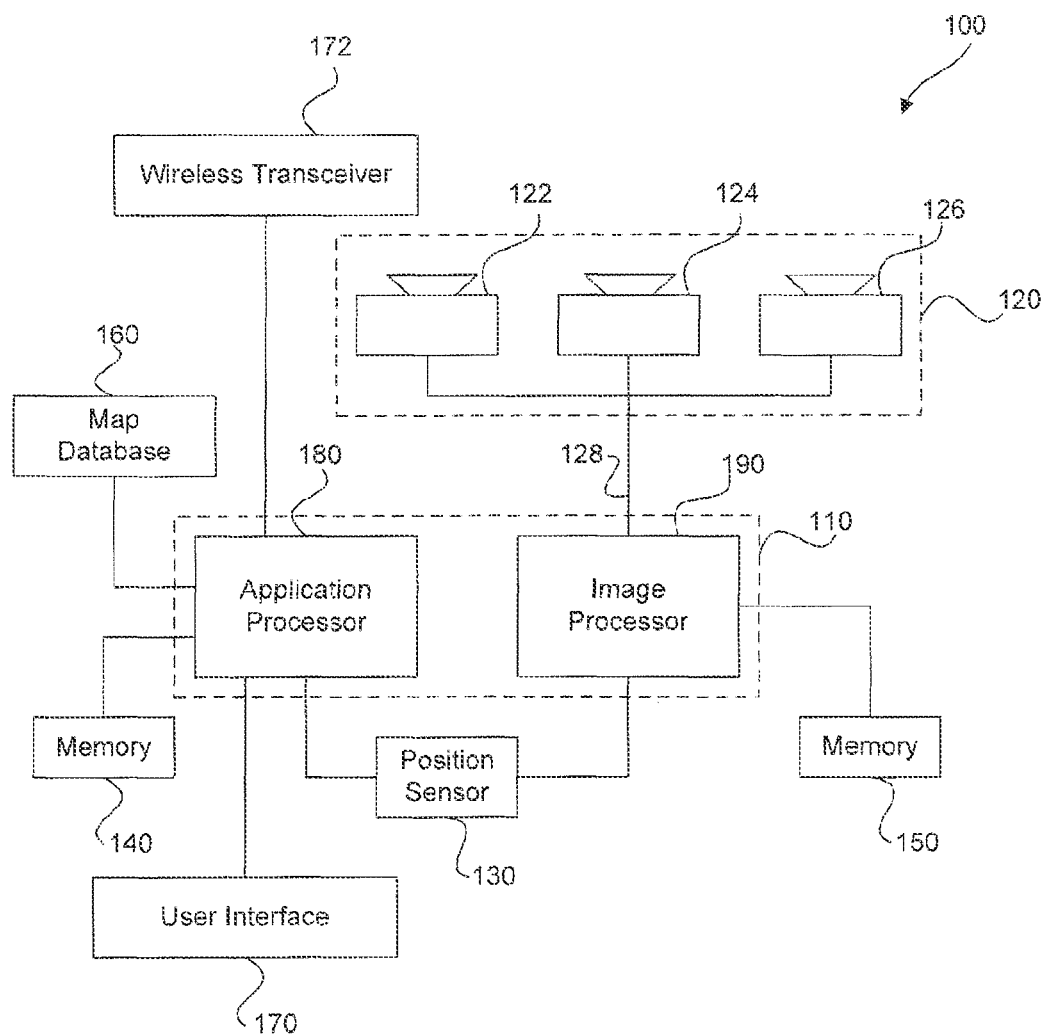
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

As used throughout this disclosure, the term "field of view" refers to the total area that a camera is capable of viewing in three dimensions. When this disclosure describes a field of view with reference to a single angle, that single angle refers to a horizontal field of view in two dimensions. As used throughout this disclosure, the term "optical axis" refers to a centerline axis of a camera's field of view. In other words, an "optical axis" is a vector at the center of projection of a camera's viewable area. Stated another way, the "optical axis" is an axis about which the field of view of a camera is symmetrically oriented.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802,15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110, in another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
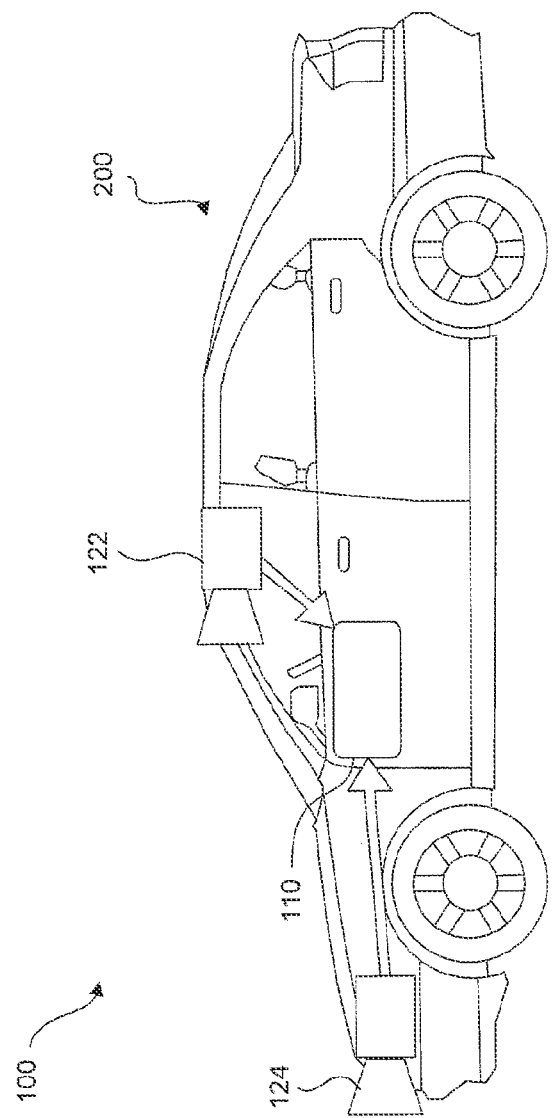
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route, traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
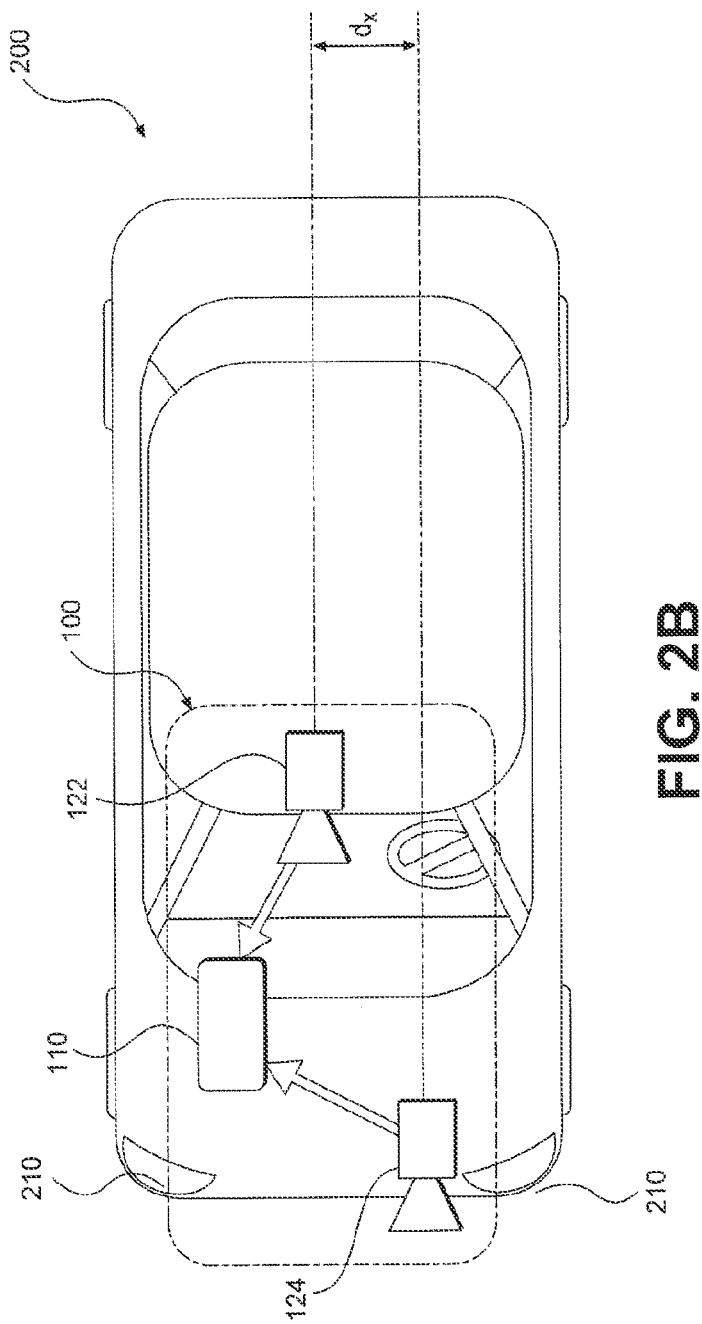
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
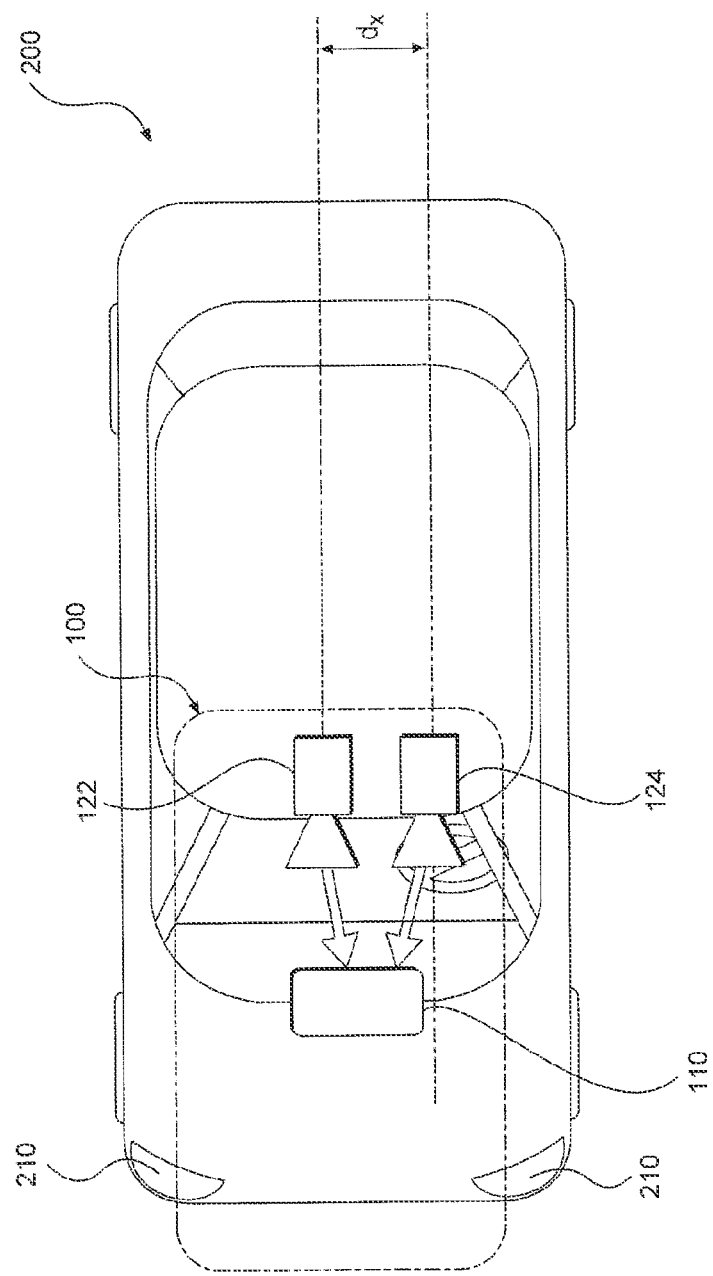
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
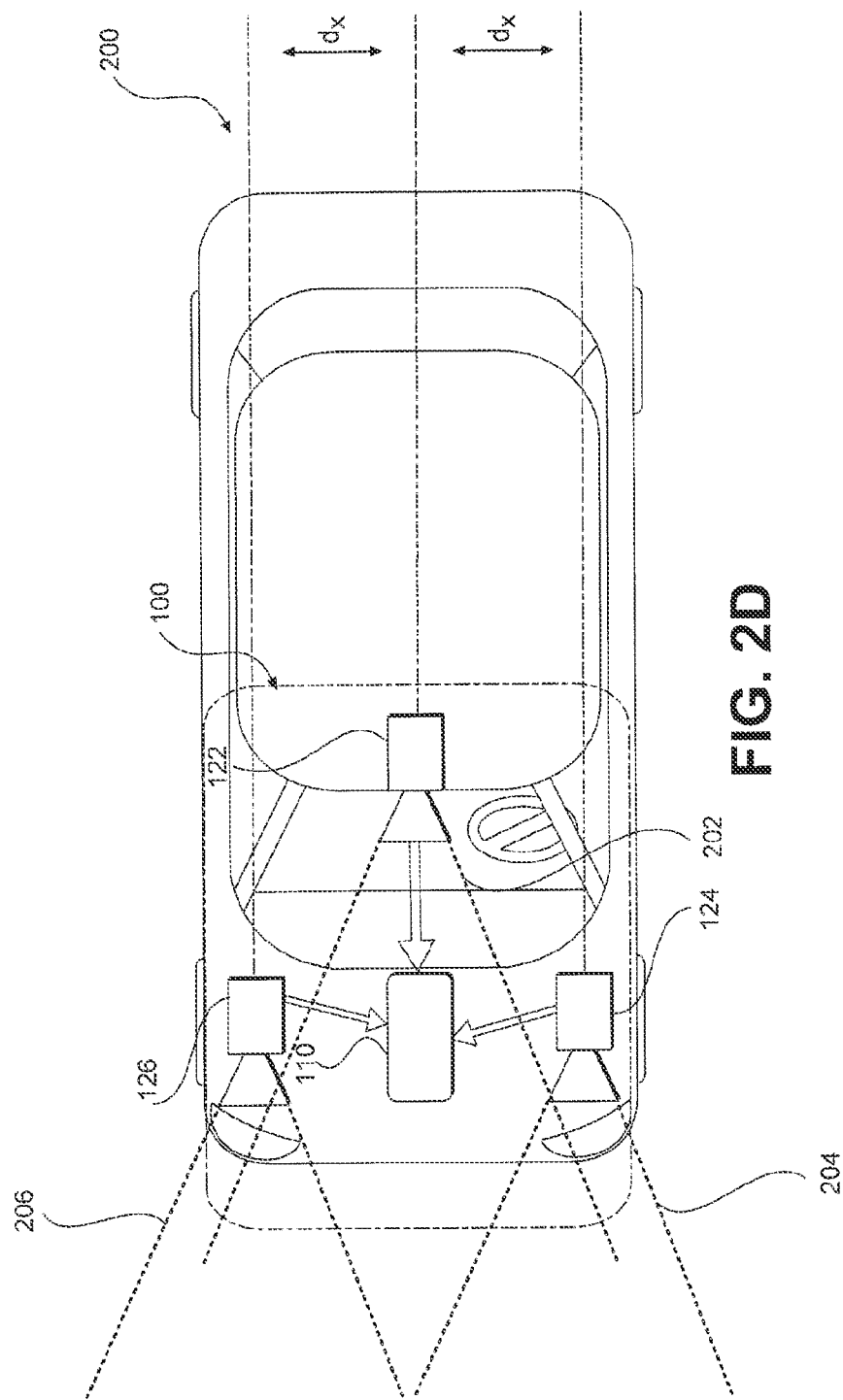
FIG. 2D is a diagrammatic top view representation of yet another embodiment of a vehicle including a system consistent with the disclosed embodiments.
Figure 2E:
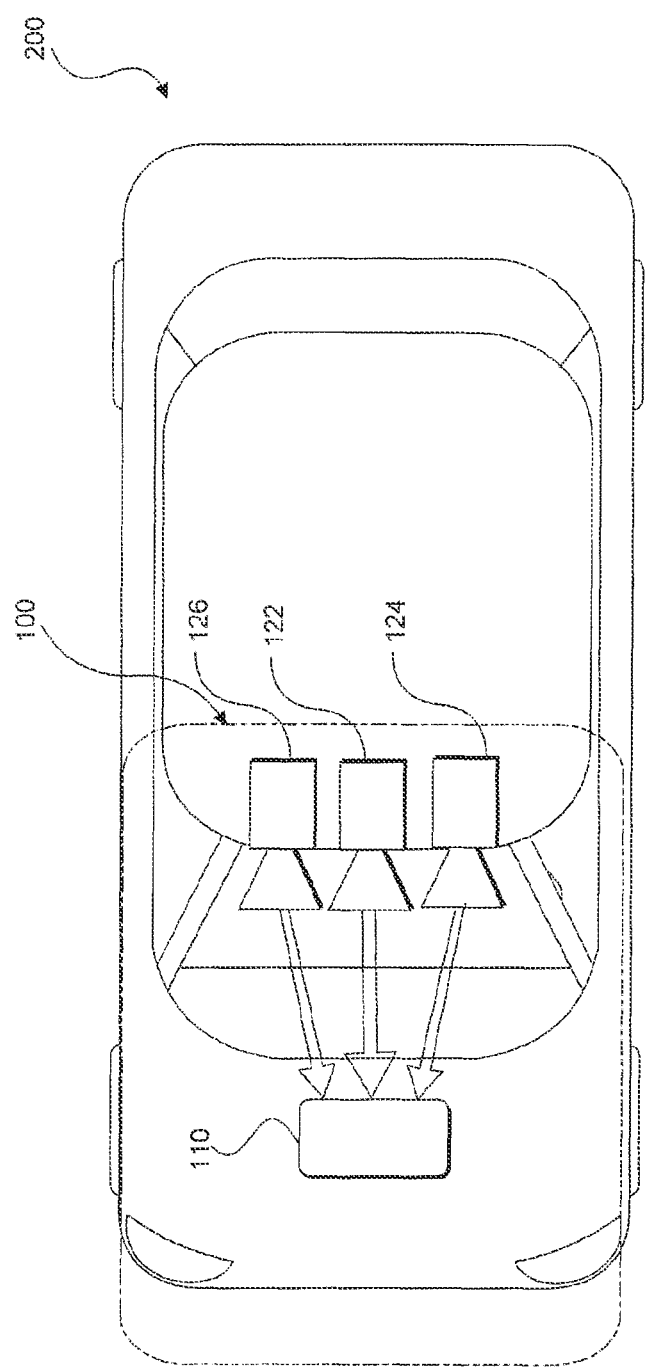
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 1.2 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., HxV=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
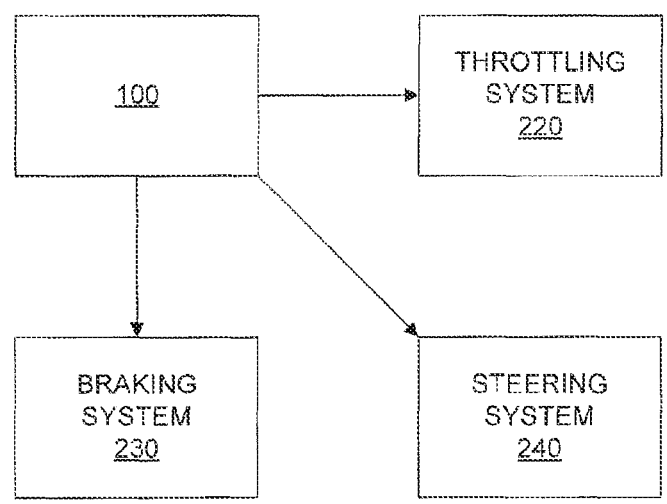
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 240 indicating operating conditions of vehicle 200 (e.g., speed, whether vehicle 200 is braking and/or turning, etc.). Further details are provided in connection with FIGS. 4-7, below.

Figure 3A:
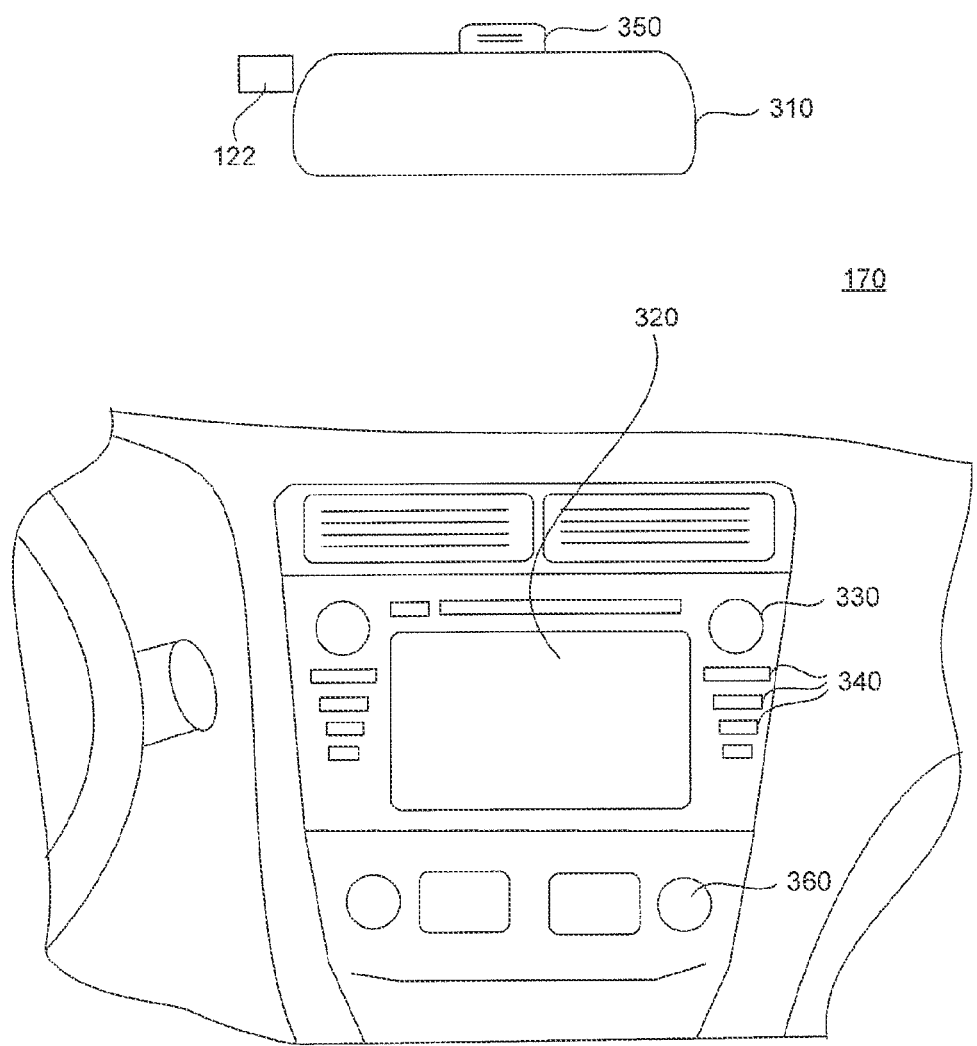
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
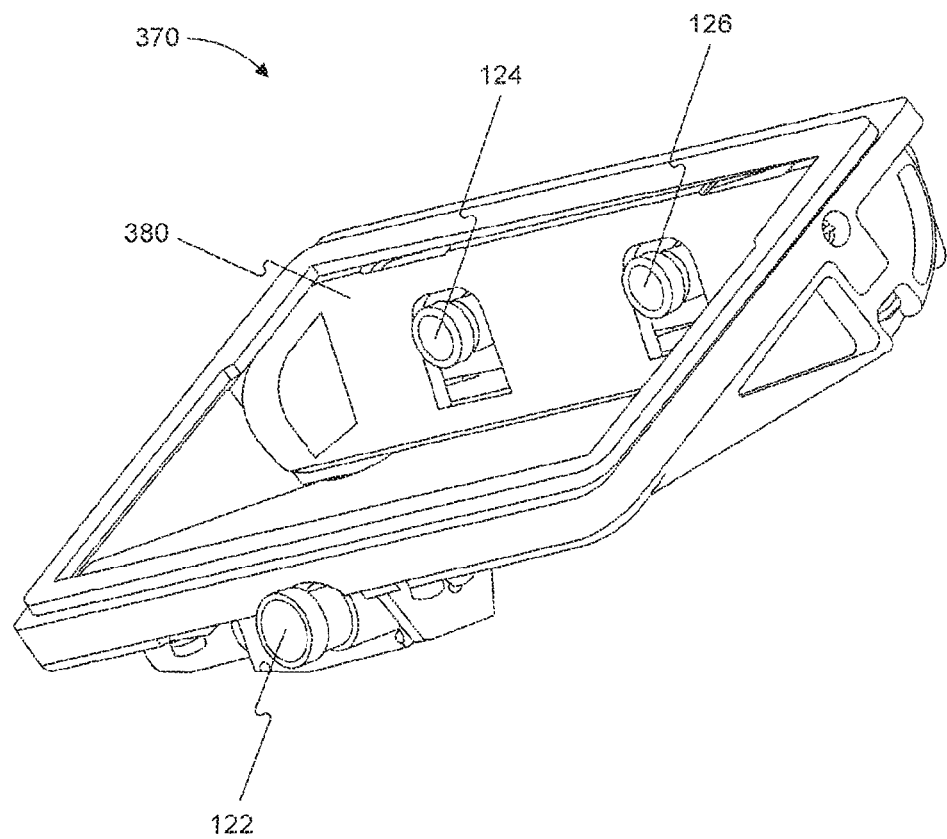
FIG. 3B is an illustration of an example of a camera mount, that is configured to be positioned behind a rearview mirror and against a vehicle windshield consistent with the disclosed embodiments.
Figure 3C:
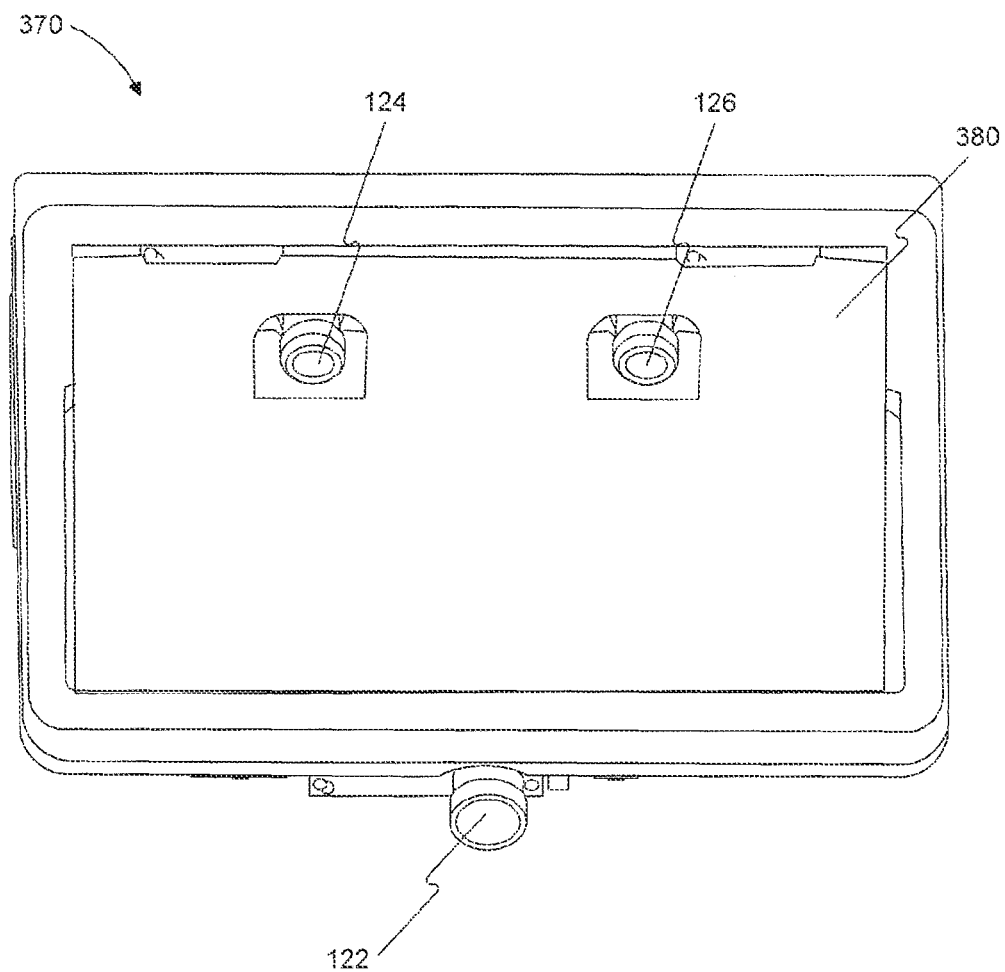
FIG. 3C is an illustration of the camera mount shown in FIG. 3B from a different perspective consistent with the disclosed embodiments.
Figure 3D:
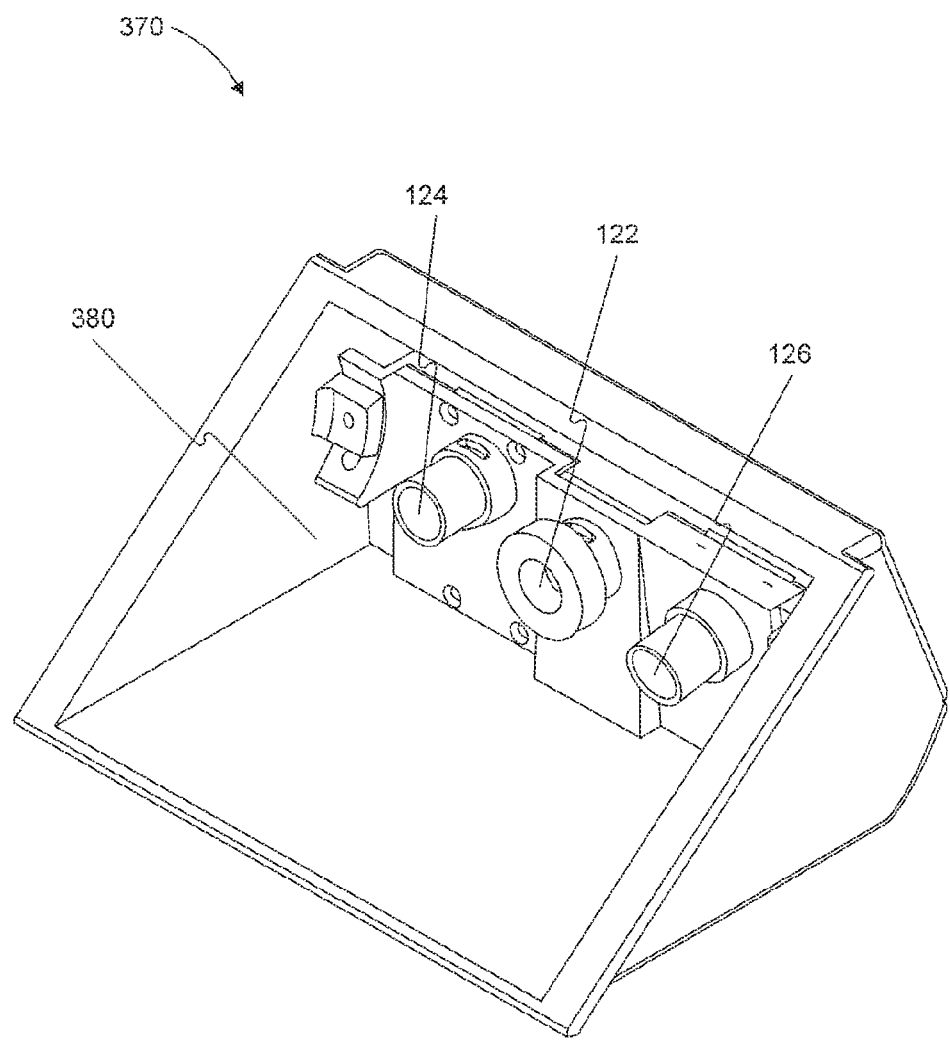
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
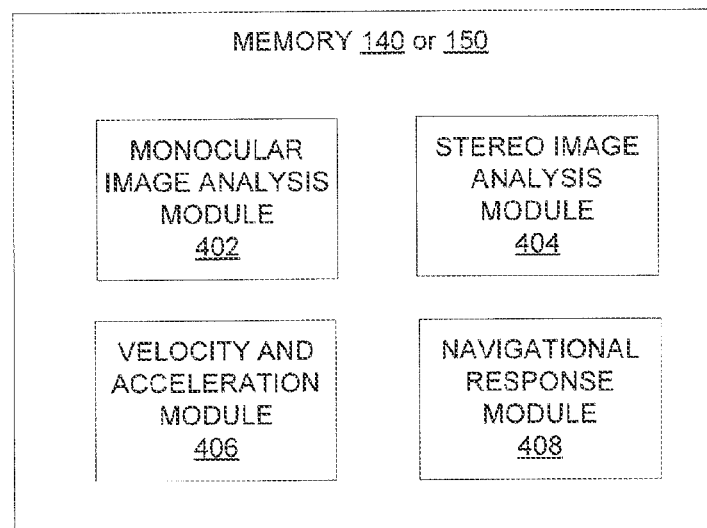
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skin in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
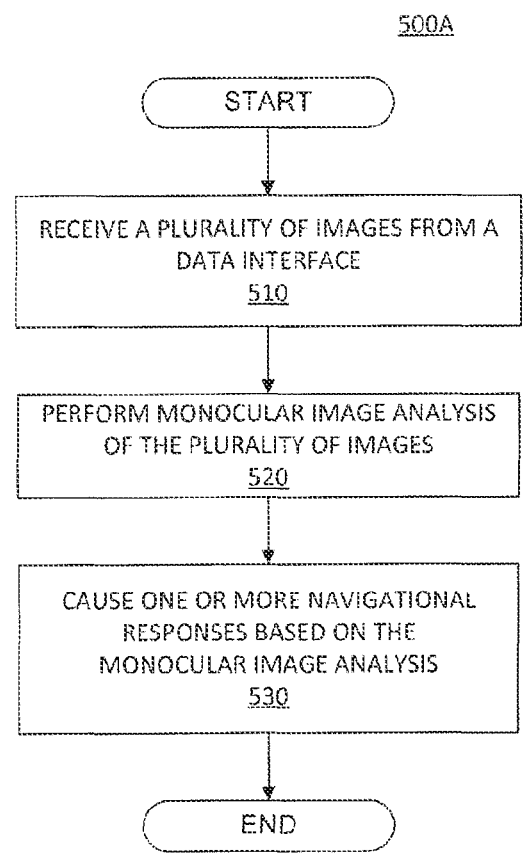
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
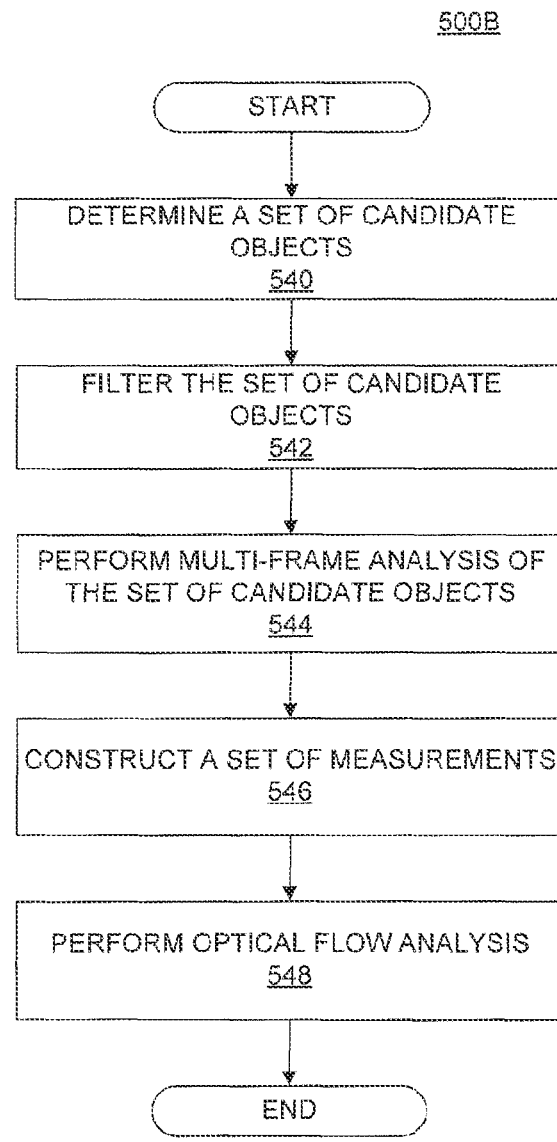
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
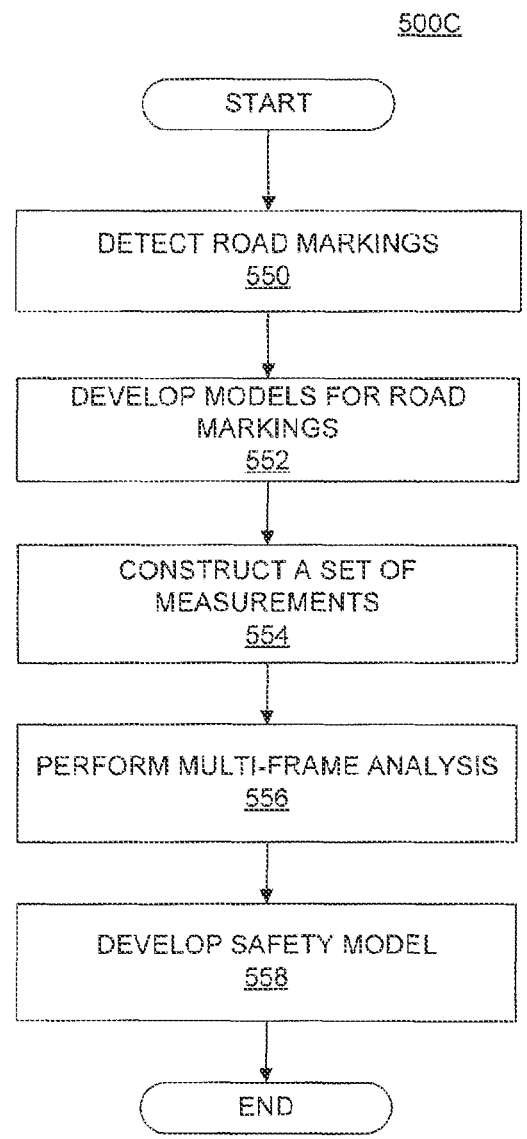
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating, frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
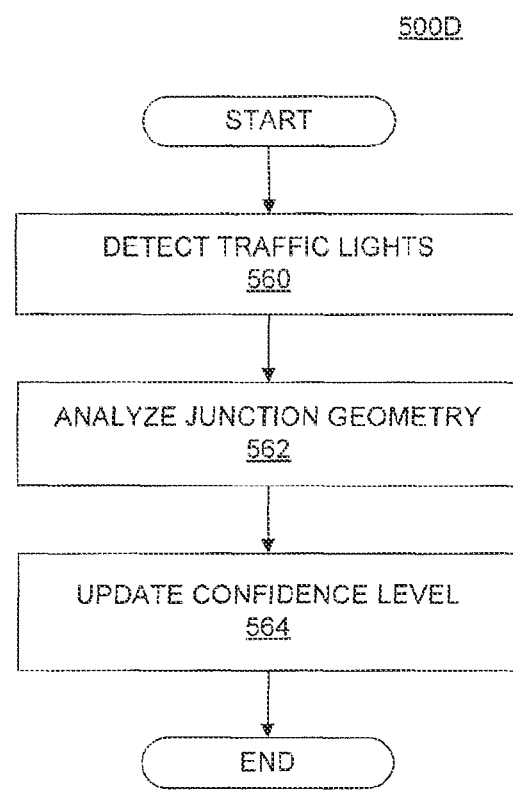
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, processing unit 110 may determine a correspondence between the traffic lights 560 and the lanes appearing near vehicle 200.

As vehicle 200 approaches the junction, at step 564, processing, unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
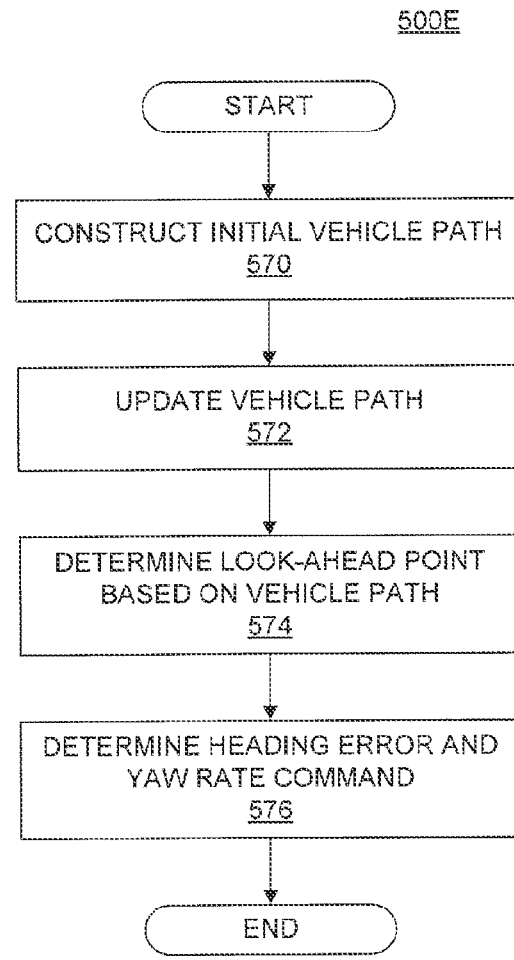
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points m the vehicle path. In another embodiment, processing unit 110 may use one polynomial and an estimated lane width to offset each point attic vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arc tangent of the look-ahead point, e.g., arc tan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
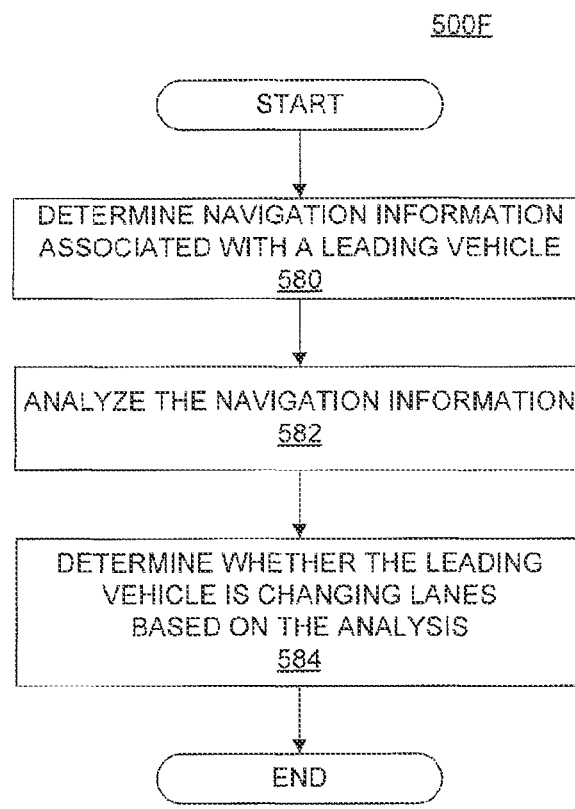
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.5 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time, (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
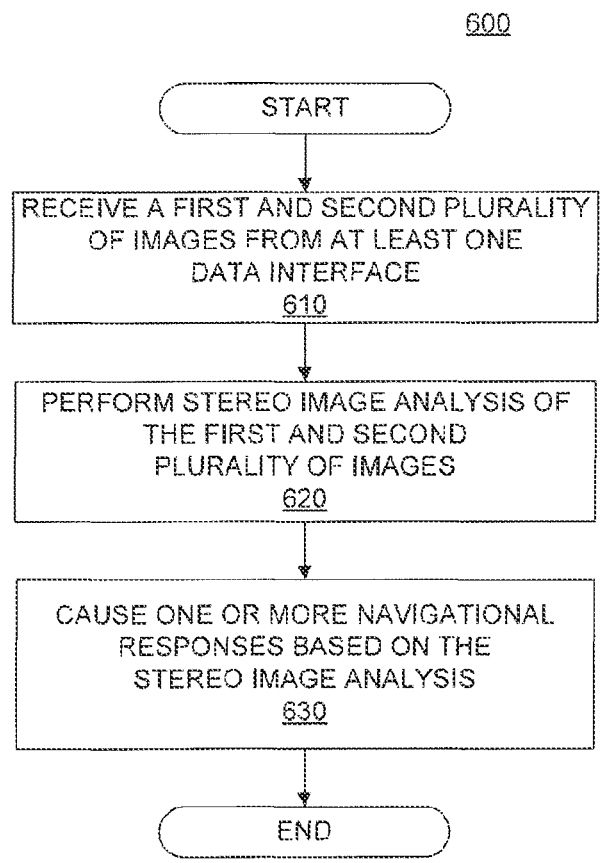
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit: ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
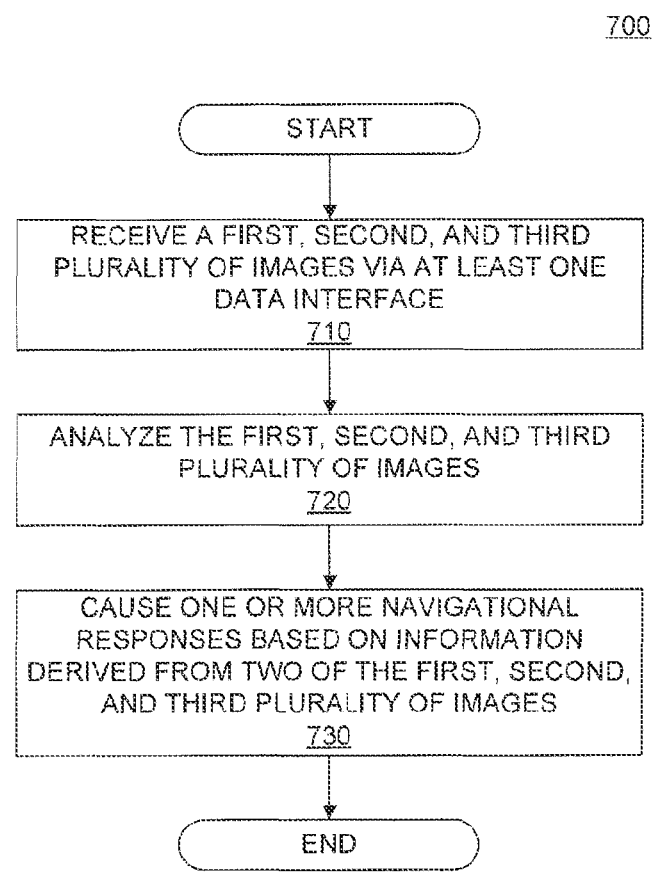
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Imaging System with a Cross Field of View

In some embodiments, vehicle 200 may include an imaging system. The imaging system may include an imaging module configured to mount on or inside of a host vehicle, e.g., an autonomous vehicle, such as vehicle 200. The term "imaging module" as used herein refers to a structure that houses and orients at least one camera. Imaging module may include other hardware and wiring dependent upon the type of camera(s) employed. The imaging module may in turn be coupled to a mounting assembly that is configured to attach the imaging module to the vehicle such that the at least one camera housed within the imaging module faces outward with respect to a vehicle, such as vehicle 200. The term "mounting assembly" as used herein refers to any hardware or device that is configured to couple the mounting module to a vehicle, such as vehicle 200. The mounting assembly may include a mounting bracket, a mounting suction coupler, a mounting frame, a mounting adhesive, a quick/connect coupler, etc. as would be understood by a person having ordinary skill in the art.

At times throughout this disclosure, the term "cross" has a particular geometric meaning as would be understood by a person having ordinary skill in the art of cameras and camera optics. For example, the term "cross" does not necessarily indicate an actual physical intersection, or even a projected intersection, but rather refers to an overlapping of at least two projections in at least one plane. This is particularly true for vector based optical axes that are parallel with the ground and originate from alternate sources at different elevations (measured from the ground). For example, consider a first vector based optical axes that projects outward and parallel to the ground at a height of 1 meter and a second vector based optical axes that projects outward and parallel to the ground at a height of 1.2 meters. According to this example, it is possible that the first vector based optical axis "crosses" over the second vector based optical axis when projected onto a plan view illustration even though the vectors do not necessarily intersect.

Stated another way, if a first three dimensional vector based optical axis is projected as a first two dimensional optical axis (or first line) and a second three dimensional vector based optical axis is projected as a second two dimensional optical axis (or second line) and they are viewed from a plan view perspective (or another two dimensional perspective) the first optical axis and second optical axis will appear to intersect one another at a "crossing point". Additionally, it is to be understood that the "crossing point" is derived from geometric principles and is not necessarily an actual intersection of the two optical axes in three dimensional space.

Another way of understanding a "crossing point" is that the "crossing point" is a location of a point on a plane that crosses with the first vector based optical axes and second vector based optical axes as derived from geometric principles. Similarly, a "crossing plane" is to be understood as a geometric plane that intersects at least two vector based optical axes. Therefore, a "crossing plane" includes a corresponding "crossing point" that corresponds to a projected intersection of at least: two optical axes.

In some embodiments, the imaging system may include at least two cameras that have respective field of views that overlap one another and form a combined field of view. In some embodiments, the imaging system may include three or more cameras that have respective field of views that cross at least one other camera and form a combined field of view.

In some embodiments, the mounting assembly may be configured to attach the imaging module to the vehicle such that the cameras face outward with respect to the vehicle. In some embodiments, the mounting assembly may also orient the cameras such that they face outward with respect to the vehicle and are parallel to the ground. The mounting assembly may be configured to attach the imaging module to an interior window of a vehicle, or another component of the vehicle e.g., a bumper, pillar, headlight, taillight, etc. In some embodiments, the mounting assembly may also be configured to compensate for the inclination of a window.

In some embodiments, the imaging system may include a wiper assembly having a wiper blade that is configured to remove obstructions from the field of view of the respective cameras. The wiper assembly may further include a timer, sensor, and motor configured to control the wiper blade on an as needed basis.

In some embodiments, the imaging system may include a glare screen or filter. The glare screen or filter may improve the performance of the imaging system by reducing the glare from the off incident light caused by the inclination (e.g., slope) of a window. Furthermore, the glare shield may be configured to provide an aperture to the cameras and thereby increases a depth of field resulting in a plurality of disparate objects at a wide range of distances remaining in focus.

Figure 8:
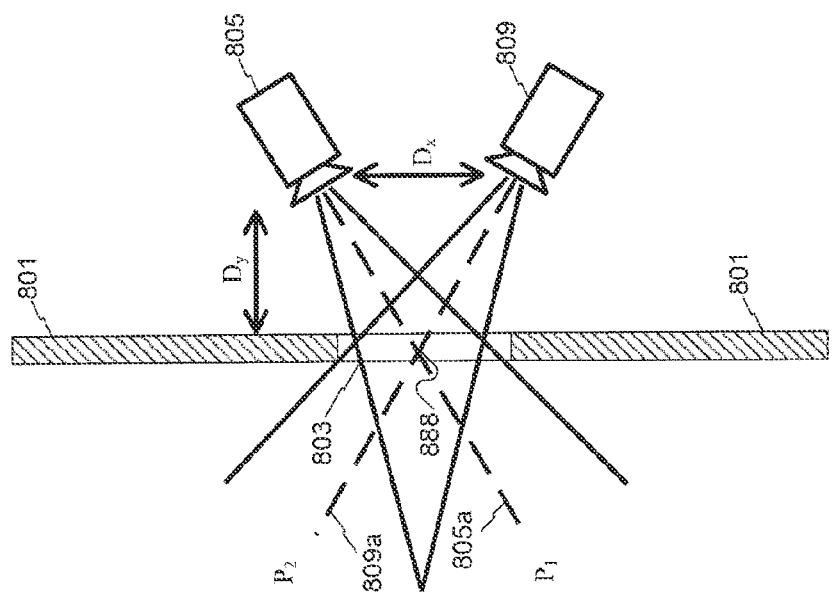
FIG. 8 is a diagrammatic representation of an embodiment of an imaging system consistent with the disclosed embodiments.

FIG. 8 is a diagrammatic representation of an embodiment of an imaging system having two cameras. The exemplary embodiment may include at least a first camera 805 and a second camera 809. Although two cameras are depicted in FIG. 8, in some embodiments, the imaging system may include more than two cameras (e.g., three cameras, four cameras, five cameras, etc.). In some embodiments, the cameras (e.g., first camera 805 and second camera 809) may share one or more characteristics of image capture devices 122, 124, and 126, discussed above.

As shown in FIG. 8, the first camera 805 has a first field of view with an optical axis 805a and the second camera 809 has a second field of view with an optical axis 809a. According to some embodiments, the first camera 805 and the second camera 809 are arranged (e.g. orientated) such that a first optical axis 805a of the first camera 805 crosses over a second optical axis 809a of the second camera 809 in at least one plane, (e.g., horizontal plane, vertical plane, or both the horizontal plane and vertical plane). In some embodiments, the first camera 805 and the second camera 809 may be secured with an imaging module that is secured to or coupled to a mounting assembly that is in turn secured to or coupled to a mounting bracket. In some embodiments, the imaging module is configured to arrange the first camera 805 and the second camera 809 along an arc of a semi-circle.

It should be understood that FIG. 8 illustrates a view projection of cameras 805 and 809 in two dimensions (X,Y) or "2D". Optical axes 805a and 809a are vector based optical axes although they are illustrated as two dimensional projections for illustrative purposes only. As illustrated, optical axis 805a crosses optical axis 809a at a crossing point 888 of a crossing plane (not illustrated), although the optical axes 805a and 809a appear to intersect in the illustrated 2D representation they may not actually intersect in 3D. As illustrated, crossing point 883 coincides with a central region of a clear transparent area 803. In this way, optical axis 805a crosses optical axis 809a in a horizontal plane. In other embodiments, optical axis 805a crosses optical axis 809a in a vertical plane. In other embodiments still, optical axis 805a crosses optical axis 809a in a horizontal plane and vertical plane. Although crossing point 888 is illustrated at a location that coincides with a central region of relatively small and transparent area 803, crossing point 888 may be located differently. For example, crossing point 888 of the crossing plane may be located farther away from first camera 805 and second camera 809 such that it is located outside of relatively small and transparent area 803. Alternatively, crossing point 888 of the crossing plane may be located closer to first camera 805 and second camera 809 such that it is located outside of relatively small and transparent area 803. In this way, crossing point 888 of the crossing plane may be located a predetermined distance from relatively small and transparent area 803 e.g., within the range of about 0.2 meters to 2.0 meters or 0.5 meters to 1.0 meters. In at least one embodiment first camera 805 and second camera 809 are configured for installation behind a window of a vehicle and crossing point 888 of the crossing plane is located between the window and the first camera 805 and the second camera 809. In at least one embodiment, first camera 805 and second camera 809 are configured for installation behind a window of a vehicle and crossing point 888 of a crossing plane is located a predetermined distance from an exterior surface of the window.

In the exemplary embodiment, first camera 805 is focused at focal point $P_1$ and second camera 809 is focused at focal point $P_2$. In this way, focal point $P_1$ is located a first horizontal distance beyond crossing point 888 of the crossing plane and focal point $P_2$ is located a second horizontal distance beyond crossing point 888 of the crossing plane. As illustrated, the first horizontal distance and second horizontal distance are substantially equal distances, although they could be different distances in alternate embodiments. For example, $P_1$ may be approximately 1.5× times the horizontal distance of $P_2$. In other embodiments, $P_1$ may be approximately 1.25×, 1.75×, 2.0×, 2.5×, or 3.0× times the horizontal distance of $P_2$. Furthermore, it should be noted that $P_1$ and $P_2$ are not necessarily a singular point in three dimensional space, i.e., focal point $P_1$ and focal point $P_2$ may each encompass a respective focal area as would be understood by a person having ordinary skill in the art of camera's and camera optics. Further still, the focal area corresponding to focal point $P_1$ and the focal area corresponding to focal point $P_2$ may overlap, at least partially.

In the exemplary embodiment, the crossing point 888 of the crossing plane is spaced apart from first camera 805 and second camera 809 by a spacing distance $D_y$ that is about equal to a shortest distance $D_x$ between a lens of first camera 805 and a lens of second camera 807. As illustrated, a shortest distance $D_x$ between the lens of first camera 805 and the lens of second camera 807 is represented by $D_x$ and a spacing distance $D_y$ between a crossing point 888 of the crossing plane and first camera 805 and second camera 809 is represented by $D_y$. It should be understood that a spacing distance $D_y$ may be measured from the lens of camera 805 or camera 809 and that spacing distance $D_y$ may therefore be different. In some embodiments spacing distance $D_y$ may fall within a range of one to four times shortest distance $D_x$. In other embodiments spacing distance $D_y$ may fall within a range of one to two, two to three, three to four, two to three, or two to four, times shortest distance $D_x$. In some embodiments, $D_x$ and $D_y$ may be expressed as a ratio that defines a distance at which a crossing point (e.g., crossing point 888) of a crossing plane may be located. For example, $Dy \leq N \times D_x$ where $2 \leq N \geq 4$.

As illustrated, the first field of view of camera 805 and the second field of view of camera 809 overlap and form a combined field of view that is approximately 90° degrees. In some embodiments, the first field of view of camera 805 and the second field of view of camera 809 may only partially overlap but nonetheless form a combined field of view. Clear transparent area 803 may be delineated by component 801 as a boundary. Component 801 may be a solid feature such as a vehicle component, e.g., a pillar, a bumper, a door panel, a headlight, a side window, a front window, etc. In at least one embodiment, component 801 may include clear transparent area 803 that allows light to pass through such that clear transparent area 803 is surrounded, at least partially, by a nontransparent area corresponding to the hatched area (i.e., component 801) of FIG. 8. In this way, the relatively smaller and transparent area 803 is smaller than a comparative transparent area that would be required by a wide angle camera having a wide angle field of view equal to the combined field of view of the first camera and the second camera. In other embodiments, component 801 may be the perimeter of an imaging bracket or module that is adhered to the outside of a host vehicle.

Figure 9:
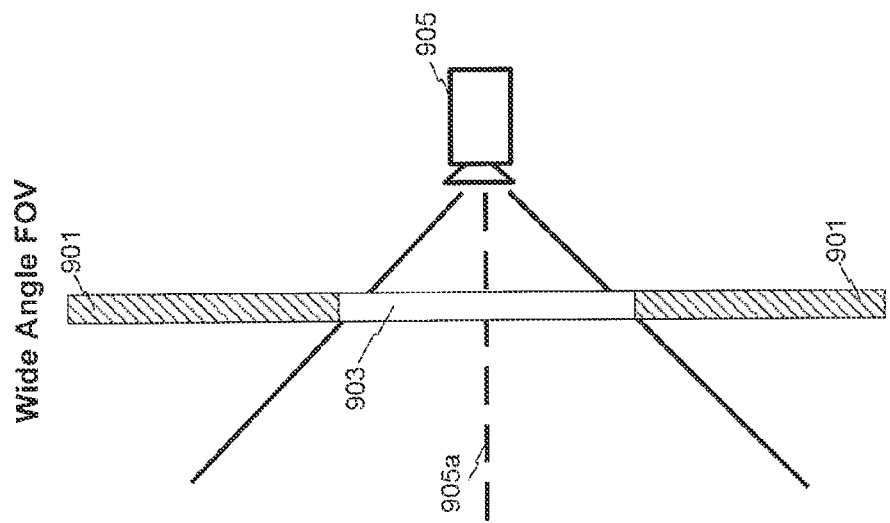
FIG. 9 is a diagrammatic representation of a single camera wide field of view imaging system.

FIG. 9 is a diagrammatic representation of a single camera wide field of view system. In some embodiments, the camera (e.g., single camera 905) may share one or more characteristics of image capture devices 122, 124, and 126, discussed above. Single camera 905 has a field of view with an optical axis 905*a* that projects outward of a relatively large clear transparent area 903. As illustrated, optical axis 905*a* projects outward and divides the field of view of single camera 905 into two symmetrical areas. The single camera 905 has a field of view substantially equal to the combined field of view of first camera 801 and second camera 809 of FIG. 8. As illustrated, the single camera 905 has a field of view that is approximately 90° degrees. As can be seen by comparing FIG. 9 to FIG. 8, clear transparent area 903 (which may be may be delineated by component 901 as a boundary) is larger than transparent area 803 of FIG. 8, but the combined field of view of the imaging system of FIG. 8 is substantially equal to the field of view of the single camera of FIG. 9. Clear transparent area 903 must be larger than clear transparent area 803 to accommodate a field of view with a comparable coverage area because the single camera wide field of view system uses a single camera 905. As a consequence, the footprint associated with the single wide field of view system is greater than the footprint of the embodiment of FIG. 8. It is an object of the present disclosure to minimize the footprint of an imaging system yet to accommodate a wide field of view (combined field of view).

Figure 10:
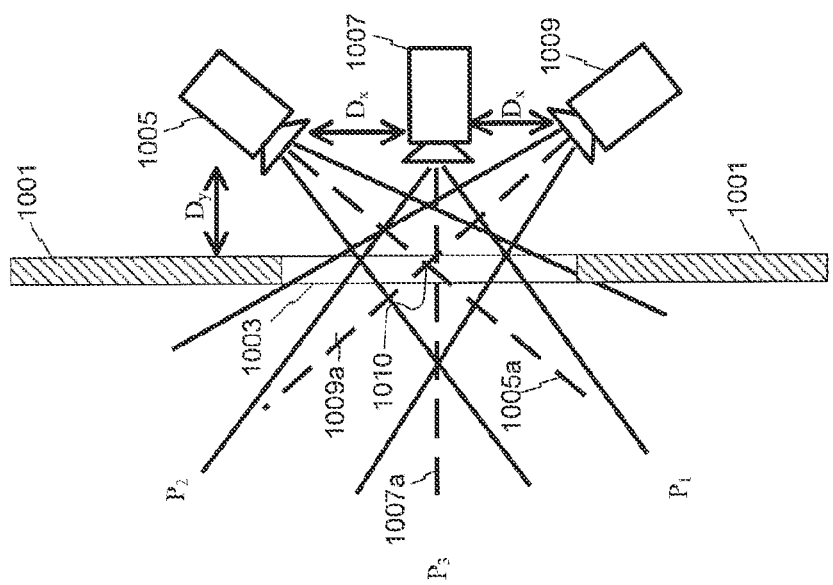
FIG. 10 is a diagrammatic representation of another embodiment of an imaging system consistent with the disclosed embodiments.

FIG. 10 is a diagrammatic representation of an embodiment of an imaging system having three cameras. The exemplary embodiment may be similar to the embodiment of FIG. 8. The exemplary embodiment may include a first camera 1005, a second camera 1007, and a third camera 1009. In some embodiments, the cameras (e.g., first camera 1005, second camera 1007, and third camera 1009) may share one or more characteristics of image capture devices 122, 124, and 126, discussed above.

As shown in FIG. 10, the first camera 1005 has a first field of view with an optical axis 1005*a*, the second camera 1009 has a second field of view with an optical axis 1009*a*, and the third camera 1007 has a third field of view with an optical axis 1007*a*. It should be understood that FIG. 10 illustrates a view projection of cameras 1005, 1007, and 1009 in two dimensions (X,Y) or "2D". Optical axes 1005*a*, 1007*a*, and 1009*a* are vector based optical axes although they are illustrated as two dimensional projections for illustrative purposes only. As illustrated, optical axis 1005*a*, optical axis 1009*a*, and optical axis 1007*a* cross over one another in at least one crossing point 1010 of a crossing plane, (e.g., horizontal plane, vertical plane, or both the horizontal plane and vertical plane). In the exemplary embodiment, third camera 1007 is positioned substantially center of and equidistant to first camera 1005 and second camera 1009. However, in other embodiments, the third camera 1007 may be positioned alternately, e.g., not in the center and/or closer to first camera 1005 or second camera 1009. In other embodiments still, third camera 1007 may be positioned forward of first camera 1005 and second camera 1009, e.g., closer to relatively small and clear transparent area 1003. As shown, clear transparent area 1003 may be delineated by component 1001 as a boundary. Component 1001 may be a solid feature such as a vehicle component, e.g., a pillar, a bumper, a door panel, a headlight, a side window, a front window, etc. In some embodiments, first camera 1005, second camera 1009, and third camera 1007 may be secured with an imaging module that is secured to or coupled to a mounting assembly that is in turn secured to or coupled to a mounting bracket. In some embodiments, the imaging module may be configured to arrange first camera 1005, second camera 1009, and third camera 1007 along an arc of a semi-circle. For example, the imaging module may be shaped as a semi-circle.

As illustrated, optical axes 1005*a*, 1009*a*, and 1007*a* cross one another at a crossing point 1010 of a crossing plane (not illustrated). As illustrated, a crossing point 1010 of the crossing plane coincides with a central region of a clear transparent area 1003. However, it should be noted that optical axes 1005*a*, 1009*a*, and 1007*a* may independently cross in any manner. That is, there may be additional crossing points and/or crossing planes (not illustrated). Additionally, in some embodiments, crossing point 1010 of crossing plane may represent a plurality of independent crossing points of independent crossing planes that coincidentally coincide. For example, optical axes 1005*a* and 1009*a* cross to form a first crossing point of a first crossing plane, optical axes 1005*a* and 1007*a* cross to form a second crossing point of a second crossing plane, and 1009*a* and 1007*a* cross to form a third crossing point of a third crossing plane. As illustrated, the first crossing point of the first crossing plane, the second crossing point of the second crossing plane, and the third crossing point of the third crossing plane are coincident with one another and form a coincident crossing point of a coincident crossing plane represented as crossing point 1010. Therefore, it should be understood that the term "crossing point" refers to a location where at least two optical axes (such as optical axes 1005*a*, 1009*a*, and 1007*a*) cross one another in at least one plane, e.g., a horizontal plane and/or a vertical plane.

Although crossing point 1010 of a crossing plane is illustrated at a location that coincides with a central region of relatively small and transparent area 1003, a crossing point 1010 of crossing plane may be located differently. For example, crossing point 1010 of the crossing plane may be located farther away from first camera 1005, second camera 1009, and/or third camera 1007 such that it is located outside of relatively small and transparent area 1003. Alternatively, crossing point 1010 of the crossing plane may be located closer to first camera 1005, second camera 1009, and/or third camera 1007 such that it is located outside of relatively small and transparent area 803. In this way, crossing point 1010 of the crossing plane may be located a predetermined distance from relatively small and transparent area 1003, e.g., within the range of about 0.01 meters to 2.0 meters, 0.1 meters to 0.5 meters, or 0.5 meters to 1.0 meters.

In the exemplary embodiment, first camera 1005 is focused at focal point $P_1$, second camera 1009 is focused at focal point $P_2$, and third camera 1007 is focused at focal point $P_3$. In this way, focal point $P_1$ is located a first horizontal distance beyond a crossing point of crossing point 1010, focal point $P_2$ is located a second horizontal distance beyond crossing point 1010, and focal point $P_3$ is located a second horizontal distance beyond crossing point 1010. As illustrated, the first, second, and third horizontal distances are substantially equal distances, although they could be different distances in alternate embodiments. For example, $P_1$ may be approximately 1.5× times the horizontal distance of $P_2$ and/or $P_3$ and vice versa. In other embodiments, $P_1$ may be approximately 1.25×, 1.75×, 2.0×, 2.5×, or 3.0× times the horizontal distance of $P_2$. Furthermore, it should be noted that $P_1$, $P_2$, and $P_3$ are not necessarily a singular point in three dimensional space, i.e., they may each encompass a respective focal area as would be understood by a person having ordinary skill in the art of camera's and camera optics. Further still, the focal area corresponding to $P_1$, $P_2$, and $P_3$ may overlap, at least partially.

In the exemplary embodiment, the crossing point of crossing point 1010 is spaced apart from first camera 1005, second camera 1009, and third camera 1007 by a spacing distance $D_y$ that is about equal to a shortest distance $D_x$ between a lens of first camera 1005 and a lens of second camera 1007. As illustrated, a shortest distance $D_x$ between the lens of first camera 1005 and the lens of second camera 1007 is represented by $D_x$ and a spacing distance $D_y$ between the crossing point 1010 of the crossing plane and first camera 1005 and second camera 1009 is represented by $D_y$. It should be understood that a spacing distance $D_y$ may be measured from the lens of camera 1005, camera 1009, or camera 1007 and that spacing distance $D_y$ may therefore be different. It should also be understood that a unique shortest distance $D_x$ may exist between respective cameras. In this way, each camera 1005, 1009, and 1007 may have respective shortest spacing distance $D_y$ and respective shortest distance $D_x$. In some embodiments spacing distance $D_y$ may fall within a range of one to four times shortest distance $D_x$. In other embodiments spacing distance $D_y$ may fall within a range of one to two, two to three, three to four, two to three, or two to four, times shortest distance $D_x$. In some embodiments, $D_x$ may refer to the spacing between the two cameras that are farthest apart from one another, e.g., first camera 1005 and second camera 1009. In some embodiments, $D_x$ and $D_y$ may be expressed as a ratio that defines a distance at which a crossing point 1010 of a crossing plane may be located. For example, $Dy \leq N \times D_x$ where $2 \leq N \geq 4$.

As illustrated, the field of view of the first camera 1005 overlaps with the second field of view of the second camera 1009. The field of view of the first and second cameras 1005, 1009 both overlap with the field of view of the third camera 1007. In the exemplary embodiment, optical axis 1005a crosses optical axis 1009a and optical axis 1007a in a central region of a relatively small and clear transparent area 1003. In this way, the relatively smaller and transparent area 1003 is smaller than a comparative transparent area that would be required by a wide angle camera having a wide angle field of view equal to the combined field of view of the first camera, the second camera, and the third camera. As illustrated, the first field of view of camera 1005, the second field of view of camera 1009, and the third field of view of camera 1007 form a combined field of view that that is approximately 150° degrees. In other embodiments, the combined field of view may range from 45° degrees to 180° degrees. For example, the combined field of view may be 55° degrees, 65° degrees, 75° degrees, 85° degrees, 95° degrees, 105° degrees, 115° degrees, 125° degrees, 135° degrees, 145° degrees, 155° degrees, 165° degrees, or 175° degrees.

Figure 11B:
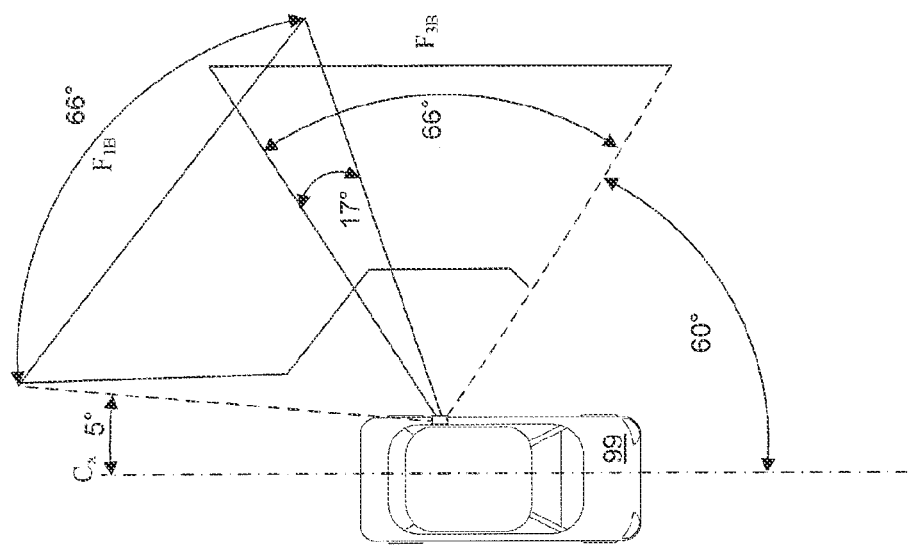
FIG. 11B is a diagrammatic plan view representation of an exemplary imaging system having a combined field of view consistent with the disclosed embodiments.
Figure 11A:
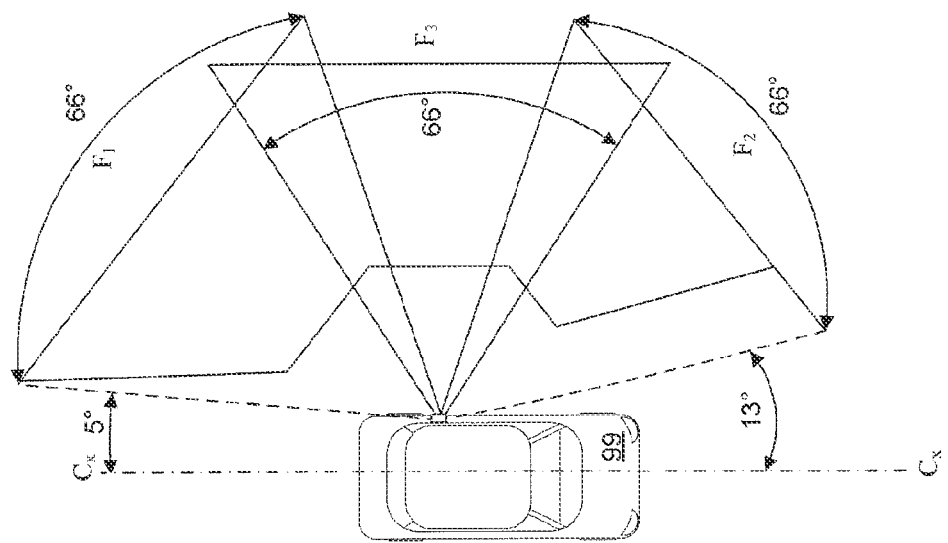
FIG. 11A is a diagrammatic plan view representation of an exemplary imaging system having a combined field of view consistent with the disclosed embodiments.

FIG. 11A is a diagrammatic plan view representation of an exemplary imaging system consistent with the three camera embodiment of FIG. 10. As shown, the exemplary imaging system of FIG. 11A may be mounted on the rear side window of vehicle 99 or on a component such as a pillar portion of the body of vehicle 99. In some embodiments, vehicle 99 may be an autonomous vehicle. For ease of understanding, vehicle 99 is shown with a central longitudinal axis $C_x$ that divides vehicle 99 lengthwise into two substantially symmetrical halves. The exemplary imaging system includes three cameras with each camera having a respective field of view. For example, the first field of view $F_1$ corresponds to a first camera having a 66° degree small cap lens, the second field of view $F_2$ corresponds to a second camera having a 66° degree small cap lens, and the third field of view $F_3$ corresponds to a third camera having a 66° degree small cap lens. In the exemplary embodiment, each camera has a field of view of 66° degrees. The first field of view $F_1$ overlaps with the third field of view $F_3$. Likewise, the second field of view overlaps with the third field of view $F_3$.

In FIG. 11A, the first field of view $F_1$ may be offset from a central longitudinal axis $C_x$ of a vehicle 99 by 5° degrees. In other embodiments, $F_1$ may be offset from a central longitudinal axis $C_x$ of a vehicle 99 by a range of 5° degrees to 30° degrees, e.g., 10° degrees, 15° degrees, 20° degrees, or 25° degrees. The second field of view $F_2$ may be offset from central longitudinal axis $C_x$ of vehicle 99 by 13° degrees. In other embodiments, $F_2$ may be offset from a central longitudinal axis $C_x$ of a vehicle 99 within a range of 5° degrees to 30° degrees, e.g., 10° degrees, 15° degrees, 20° degrees, or 25° degrees. In the exemplary embodiment, the third field of view $F_3$ overlaps an equal amount with first field of view $F_1$ and second field of view $F_2$. In other embodiments, third field of view $F_3$ is substantially perpendicular to the central longitudinal axis $C_x$ of vehicle 99. In other embodiments, the third field of view $F_3$ may be offset from the central longitudinal axis $C_x$ of the vehicle 99, i.e., its optical axis is not perpendicular to central longitudinal axis $C_x$.

In the exemplary embodiment, the combined field of view is 162° degrees. In other embodiments, the combined field of view may be greater or smaller. For example, in other exemplary embodiments, the combined field of view may range from 100° degrees to 175° degrees, e.g., 110° degrees, 120° degrees, 130° degrees, 140° degrees, 150° degrees, 165° degrees, etc.

FIG. 11B is a diagrammatic plan view representation of an exemplary imaging system consistent with the two camera embodiment of FIG. 8. The exemplary imaging system is similar to the embodiment of FIG. 11A. Therefore, like features will not be explained at length. In the exemplary embodiment, the first field of view $F_{1B}$ corresponds to a first camera having a 66° degree small cap lens, the second field of view $F_{3B}$ corresponds to a second camera having a 66° degree small cap lens. In the exemplary embodiment, each camera has a field of view of 66° degrees. The first field of view $F_{1B}$ overlaps with the third field of view $F_{3B}$.

In FIG. 11B, the first field of view $F_{1B}$ may be offset from a central longitudinal axis $C_x$ of a vehicle 99 by 5° degrees. In other embodiments, $F_{1B}$ may be offset from a central longitudinal axis $C_x$ of vehicle 99 by a range of 5° degrees to 30° degrees e.g., 10° degrees, 15° degrees, 20° degrees, or 25° degrees. The second field of view $F_{3B}$ may be offset from central longitudinal axis $C_x$ of vehicle 99 by 60° degrees. In other embodiments, $F_{3B}$ may be offset from a central longitudinal axis $C_x$ of vehicle 99 within a range of 30° degrees to 90° degrees, e.g., 10° degrees, 20° degrees, 30° degrees, 40° degrees, 50° degrees, 60° degrees, 70° degrees, 80° degrees, or 90° degrees.

In the exemplary embodiment, the combined field of view is 115° degrees. In other embodiments, the combined field of view may be greater or smaller. For example, in other exemplary embodiments, the combined field of view may range from 90° degrees to 175° degrees, e.g., 95° degrees, 100° degrees, 110° degrees, 120° degrees, 130° degrees, 140° degrees, 150° degrees, 165° degrees, etc.

Figure 12B:
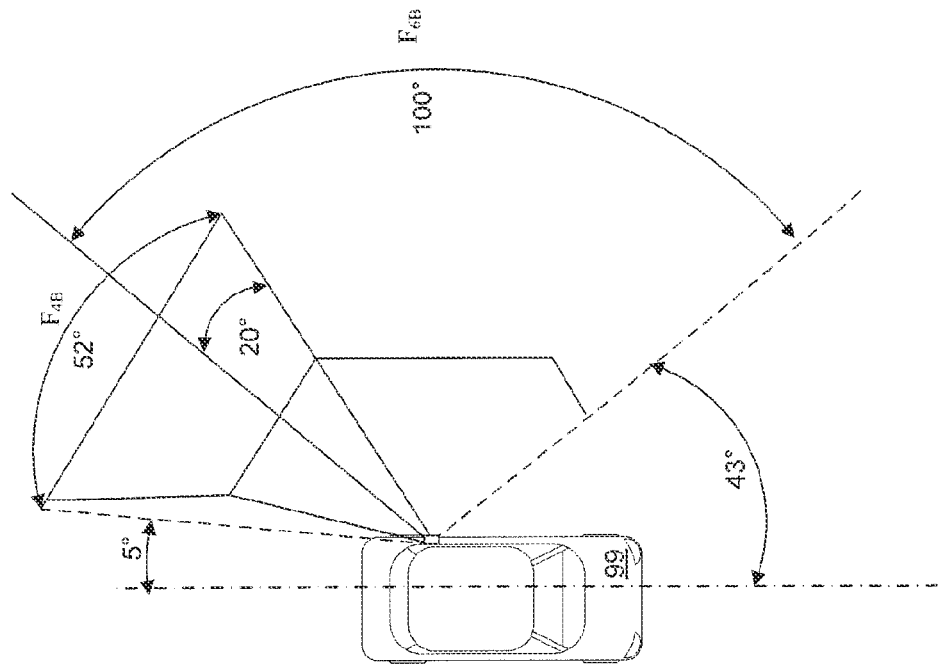
FIG. 12B is a diagrammatic plan view representation of another exemplary imaging system having combined field of view consistent with the disclosed embodiments.
Figure 12A:
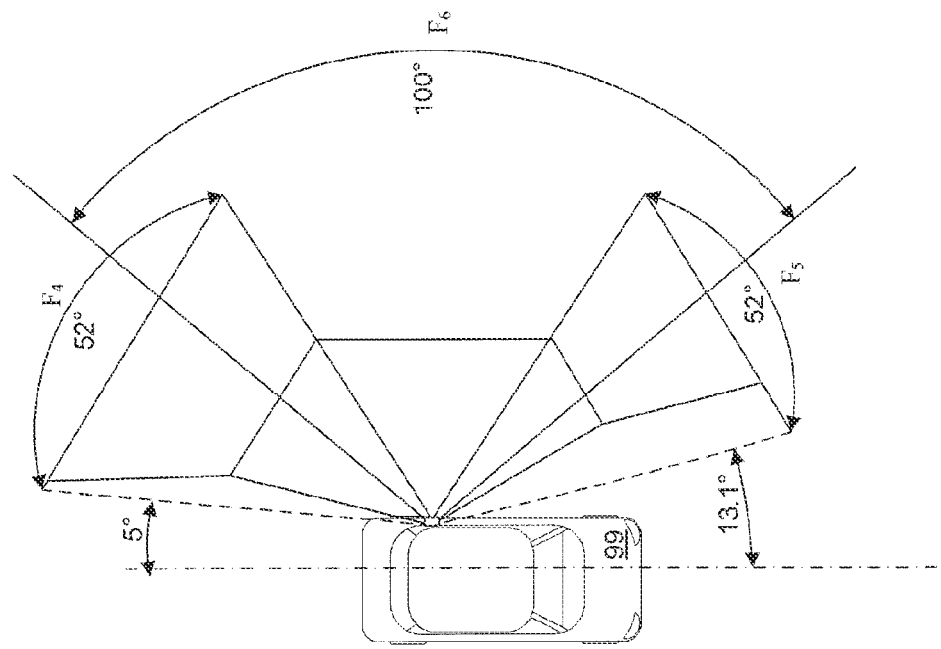
FIG. 12A is a diagrammatic plan view representation of another exemplary imaging system having combined field of view consistent with the disclosed embodiments.

FIG. 12A is a diagrammatic plan view representation of an exemplary imaging system consistent with the three camera embodiment of FIG. 10. In FIG. 12, the exemplary imaging system includes three cameras with each camera have a respective field of view. For example, the first field of view $F_4$ corresponds to a first camera having a 52° degree small cap lens, the second field of view $F_5$ corresponds to a second camera having a 52° degree small cap lens, and the third field of view $F_6$ corresponds to a third camera having a 100° degree lens. In the exemplary embodiment, the first field of view $F_4$ overlaps with the third field of view $F_6$. Likewise, the second field of view $F_5$ overlaps with the third field of view $F_6$. In other embodiments, the first camera may comprise a 52° degree small cap lens and the second camera may comprise a 52° degree small cap lens.

In FIG. 12A, the first field of view $F_4$ is offset from a central longitudinal axis $C_x$ of vehicle 99 by 5° degrees. In other embodiments, $F_4$ may be offset from a central longitudinal axis $C_x$ of a vehicle 99 within a range of 5° degrees to 30° degrees e.g., 10° degrees, 15° degrees, 20° degrees, or 25° degrees. The second field of view $F_5$ may be offset from central longitudinal axis $C_x$ of vehicle 99 by 13.1° degrees. In other embodiments, $F_5$ may be offset from a central longitudinal axis $C_x$ of vehicle 99 within a range of 5° degrees to 30° degrees, e.g., 10° degrees, 15° degrees, 20° degrees, or 25° degrees. In the exemplary embodiment, the third field of view $F_6$ overlaps an equal amount with first field of view $F_4$ and second field of view $F_5$. In other embodiments, third field of view $F_6$ is substantially perpendicular to the central longitudinal axis $C_x$ of a vehicle 99. In other embodiments, third field of view $F_6$ may be offset from the central longitudinal axis $C_x$ of vehicle 99, i.e., its optical axis is not perpendicular to central longitudinal axis $C_x$.

In some embodiments, the third field of view is oriented so that it overlaps an equal amount with first field of view $F_4$ and second field of view $F_6$. In the exemplary embodiment, the combined field of view is 161.9° degrees. In other embodiments, the combined field of view may be greater or smaller. For example, in other exemplary embodiments, the combined field of view may range from 100° degrees to 175° degrees, e.g., 110° degrees, 120° degrees, 130° degrees, 140° degrees, 150° degrees, 165° degrees, etc.

FIG. 12B is a diagrammatic plan view representation of an exemplary imaging system consistent with the three camera embodiment of FIG. 8. The exemplary imaging system is similar to the embodiment of FIG. 12B. Therefore, like features will not be explained at length. In FIG. 12B, the exemplary imaging system includes two cameras with each camera have a respective field of view. For example, the first field of view $F_{4B}$ corresponds to a first camera having a 52° degree small cap lens, the second field of view $F_{5B}$ corresponds to a second camera having a 100° degree lens. In the exemplary embodiment, the first field of view $F_{4B}$ overlaps with the second field of view $F_{6B}$.

In FIG. 12B, the first field of view $F_{4B}$ is offset from a central longitudinal axis $C_x$ of vehicle 99 by 5° degrees. In other embodiments, $F_{4B}$ may be offset from a central longitudinal axis $C_x$ of vehicle 99 within a range of 5° degrees to 30° degrees e.g., 10° degrees, 15° degrees, 20° degrees, or 25° degrees. In the exemplary embodiment, the second field of view $F_{6B}$ is offset from a central longitudinal axis $C_x$ of vehicle 99 by 43° degrees. In other embodiments, second field of view $F_{6B}$ is substantially perpendicular to the central longitudinal axis $C_x$ of a vehicle 99. In other embodiments, second field of view $F_{6B}$ may be offset from the central longitudinal axis $C_x$ of vehicle 99, i.e., its optical axis is not perpendicular to central longitudinal axis $C_x$.

In the exemplary embodiment, the combined field of view is 132° degrees. In other embodiments, the combined field of view may be greater or smaller. For example, in other exemplary embodiments, the combined field of view may range from 100° degrees to 175° degrees, e.g., 110° degrees, 120° degrees, 130° degrees, 140° degrees, 150° degrees, 165° degrees, etc.

Figure 13:
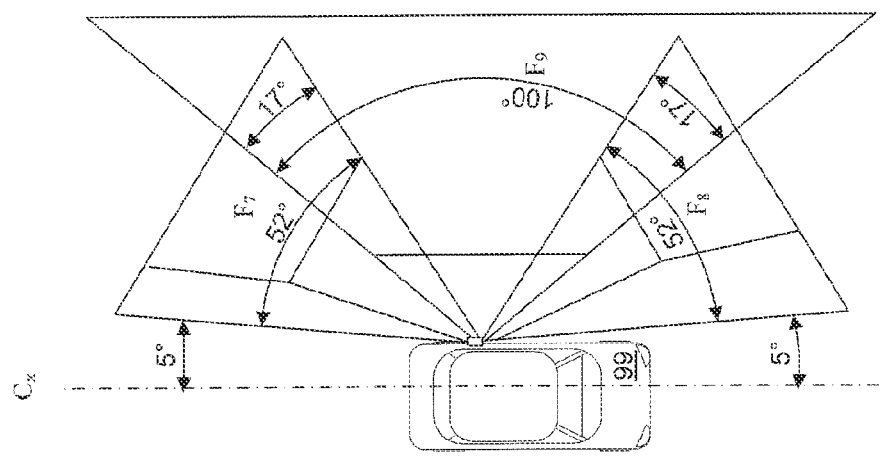
FIG. 13 is a perspective view representation of another exemplary imaging system having a combined field of view consistent with the disclosed embodiments.

FIG. 13 is a diagrammatic plan view representation of an exemplary imaging system consistent with the three camera embodiment of FIG. 10. In FIG. 13, the exemplary imaging system includes three cameras with each camera have a respective field of view. For example, the first field of view $F_7$ corresponds to a first camera having a 52° degree small cap lens, the second field of view $F_8$ corresponds to a second camera having a 52° degree small cap lens, and the third field of view $F_9$ corresponds to a third camera having a 100° degree lens. In the exemplary embodiment, the first field of view $F_7$ overlaps with the third field of view $F_9$ by 17° degrees. Likewise, the second field of view $F_8$ overlaps with the third field of view $F_9$ by 17° degrees. In other embodiments, the first field of view $F_7$ and second field of view $F_9$ may respectively overlap with the third field of view $F_9$ within a range of 10° degrees −35° degrees. For example, about 15° degrees, 20° degrees, 25° degrees, 30° degrees, or 35° degrees, etc. In FIG. 13, the first field of view $F_7$ is offset from a central longitudinal axis $C_x$ of vehicle 99 by 5° degrees and the second field of view $F_8$ is offset from a central longitudinal axis $C_x$ of vehicle 99 by 5° degrees. In the exemplary embodiment, third field of view $F_9$ is substantially perpendicular to the central longitudinal axis $C_x$ of vehicle 99, i.e., its optical axis (not illustrated) is substantially perpendicular to central longitudinal axis $C_x$ of vehicle 99. In other embodiments, the third field of view $F_9$ may be offset from the central longitudinal axis $C_x$ of the vehicle 99, i.e., its optical axis is not perpendicular to central longitudinal axis $C_x$.

Figure 14:
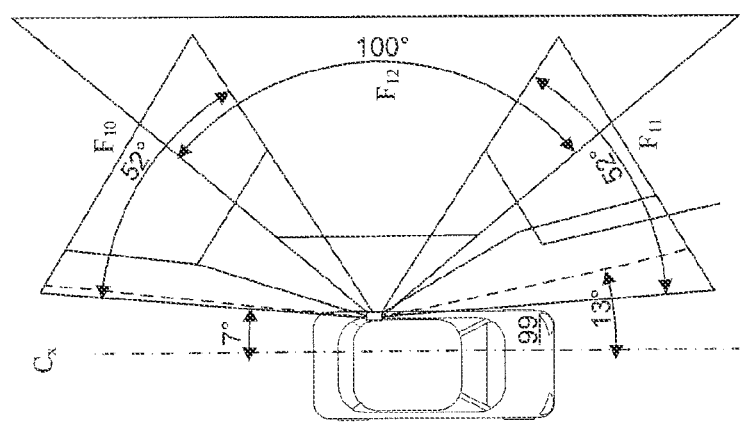
FIG. 14 is a perspective view representation of another exemplary imaging system having a combined field of view consistent with the disclosed embodiments.

FIG. 14 is a diagrammatic plan view representation of an exemplary imaging system consistent with the three camera embodiment of FIG. 10. In FIG. 14, the exemplary imaging system includes three cameras with each camera have a respective field of view. For example, the first field of view $F_{10}$ corresponds to a first camera having a 52° degree small cap lens, the second field of view $F_{11}$ corresponds to a second camera having a 52° degree small cap lens, and the third field of view $F_{12}$ corresponds to a third camera having a 100° degree lens. In the exemplary embodiment, the first field of view $F_{10}$ is offset from a central longitudinal axis $C_x$ of vehicle 99 by 7° degrees and the second field of view $F_{11}$ is offset from a central longitudinal axis $C_x$ of vehicle 99 by 13° degrees. In the exemplary embodiment, third field of view $F_{12}$ is not perfectly perpendicular to central longitudinal axis $C_x$ of vehicle 99, but it may be said to be substantially perpendicular.

Figure 16:
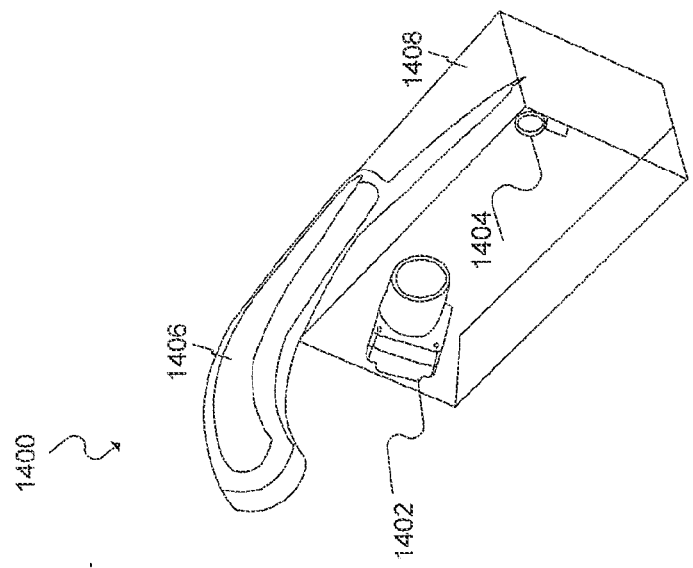
FIG. 16 is a perspective view representation of the imaging system of FIG. 15 consistent with the disclosed embodiments.
Figure 15:
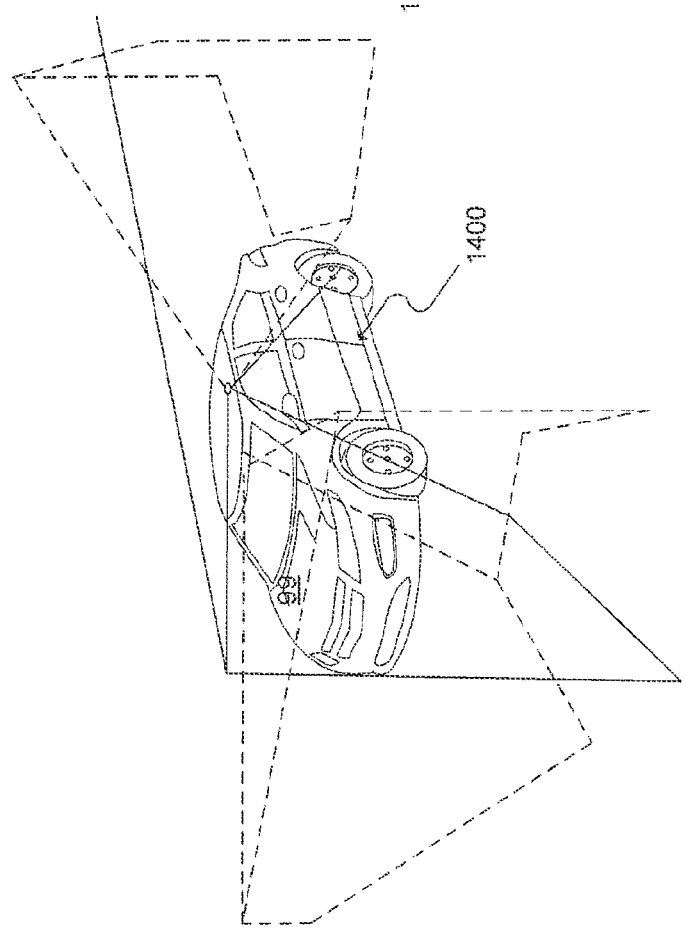
FIG. 15 is a perspective view representation of another exemplary imaging system having a combined field of view consistent with the disclosed embodiments.

FIGS. 15 and 16 are perspective view representations of another exemplary imaging system having a combined field of view consistent with the disclosed embodiments, imaging system 1400 includes a first camera 1402 and second camera 1404. Imaging system 1400 may further include a mounting assembly 1408 that houses the first camera 1402 and second camera 1404. The mounting assembly 1408 may be configured to attach imaging module 1400 to the vehicle such that the first camera 1402 and second camera 1404 face outward with respect to the vehicle as illustrated in FIG. 15. Although shown in FIG. 15 as located at the side of vehicle 99, imaging system 1400 may be located behind any window (e.g., a front window, a side window, a rear window) of vehicle 99 or included in or attached to any component (e.g., a pillar, a bumper, a door panel, a headlight, a trunk lid, a fender, a roof rack, cross bar, etc.) of vehicle 99. For example, when included a vehicle component, imaging system 1400 may be positioned behind a transparent surface (e.g., glass, Plexiglas, etc.) provided across an opening of the component.

Mounting assembly 1408 may be configured to orient the first camera 1402 and second camera 1404 parallel with the ground. Alternatively, mounting assembly 1408 may be configured to orient first camera 1402 and second camera 1404 at an offset angle with the ground, e.g., 5° degrees, 10° degrees, or 15° degrees.

Imaging system 1400 may further include a wiper assembly 1406 that includes at least one wiper blade. Wiper assembly 1406 may be configured to clear obstructions from the respective field of views of first camera 1402 and second camera 1404. In some embodiments, wiper assembly 1406 may be installed on the outside of vehicle 99. Wiper assembly 1406 may include sensing features, timer features, motorized actuators, hinged actuators, rotary actuators, etc.

FIGS. 17 and 18 are perspective view representations of another exemplary imaging system having a combined field of view consistent with the disclosed embodiments, imaging system 1800 includes a first camera 1802 (partially obscured for illustrative purposes), second camera 1804, and a third camera 1806. A mounting assembly (see 1408 of FIG. 16) is configured to attach imaging module 1800 to vehicle 99 such that first camera 1802, second camera 1804, and third camera 1806 face outward with respect to the side rear window of vehicle 99. In other embodiments, mounting assembly (see 1408 of FIG. 16) may be configured to attach imaging module 1800 to the front windshield or vehicle 99 as discussed in further detail below in connection with FIGS. 19 and 20. In other embodiments still, mounting assembly (see 1408 of FIG. 16) may be configured to attach imaging module 1800 to a component of vehicle 99, e.g., a bumper, a pillar, a door panel, a headlight, a trunk lid, a fender, a roof rack, cross bar, etc.

According to a front windshield embodiment, imaging system 1800 may be attached to the front windshield of the vehicle. According to this exemplary embodiment, the third camera module may be mounted directly forward (vertically to an axis passing through the back wheels of vehicle 99), so that the optical axis of the third camera is also directly forward. The first camera may be mounted to the left of the third camera and orientated such that the optical axis of the first camera crosses the optical axis of the third camera (e.g., from left to right), and the second camera is mounted to the right of the third camera and orientated such that the optical axis of the second camera crosses the optical axis of the third camera (e.g., from right to left). It should also be understood that the optical axis of the first and second cameras may also cross one another, although they do not necessarily need to.

Figure 19:
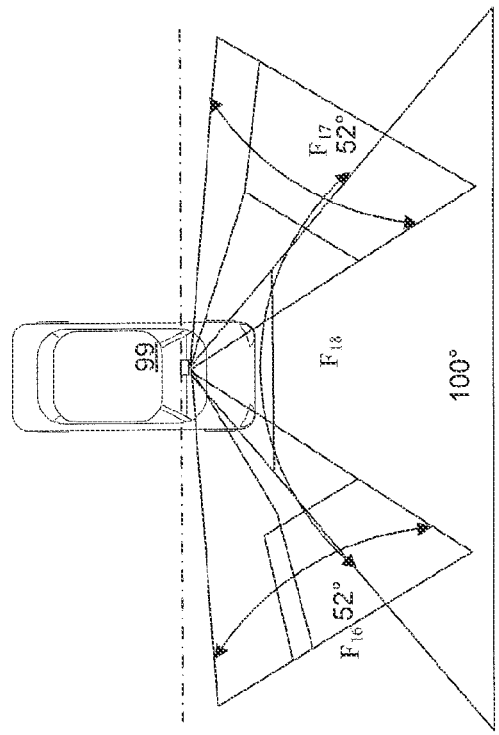
FIG. 19 is a diagrammatic plan view representation of another exemplary imaging system having a combined field of view consistent with the disclosed embodiments.
Figure 20:
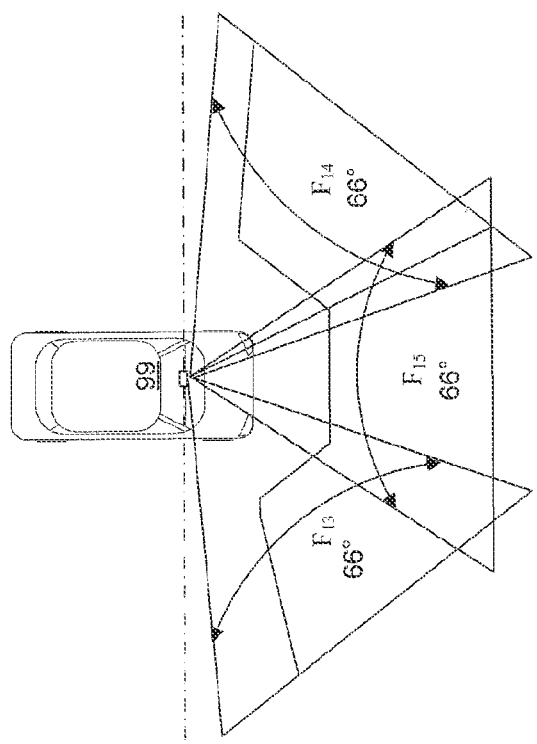
FIG. 20 is a diagrammatic plan view representation of another exemplary imaging system having a combined field of view consistent with the disclosed embodiments.

FIGS. 19 and 20 illustrate various embodiments of exemplary imaging systems for use on a front windshield of vehicle 99. FIGS. 19 and 20 are similar to previously explained embodiments and therefore like features and similarities will not be explained at length. It should be understood that all aforementioned exemplary ranges are likewise applicable to embodiments in accordance with FIGS. 19 and 20.

FIG. 19 is a diagrammatic plan view representation of an exemplary imaging system consistent with the three camera embodiment of FIG. 10 and FIGS. 11-14. In FIG. 19, the exemplary imaging system includes three cameras with each camera have a respective field of view. For example, the first field of view $F_{13}$ corresponds to a first camera having a 66° degree small cap lens, the second field of view $F_{14}$ corresponds to a second camera having a 66° degree small cap lens, and the third field of view $F_{15}$ corresponds to a third camera having a 66° degree lens. In the exemplary embodiment, the first field of view $F_{13}$ overlaps with the third field of view $F_{15}$. Likewise, the second of view $F_{14}$ overlaps with the third field of view $F_{15}$.

FIG. 20 is a diagrammatic plan view representation of an exemplary imaging system consistent with the three camera embodiment of FIG. 10. In FIG. 20, the exemplary imaging system includes three cameras with each camera have a respective field of view. For example, the first field of view $F_{16}$ corresponds to a first camera having a 52° degree small cap lens, the second field of view $F_{17}$ corresponds to a second camera having a 52° degree small cap lens, and the third field of view $F_{18}$ corresponds to a third camera having a 100° degree lens. In the exemplary embodiment, the first field of view $F_{16}$ overlaps with the third field of view $F_{18}$. Likewise, the second field of view $F_{17}$ overlaps with the third field of view $F_{18}$. In some embodiments, the combined field of view may comprise 180° degrees forward of the vehicle.

Figure 21:
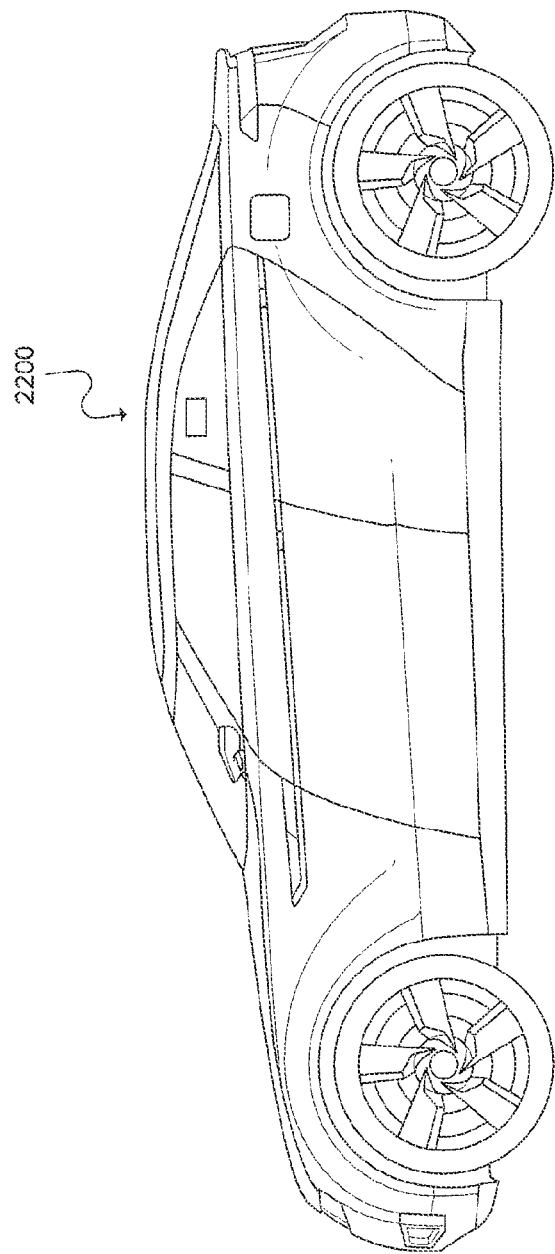
FIG. 21 is an elevation view representation of another exemplary imaging system consistent with the disclosed embodiments.
Figure 22:
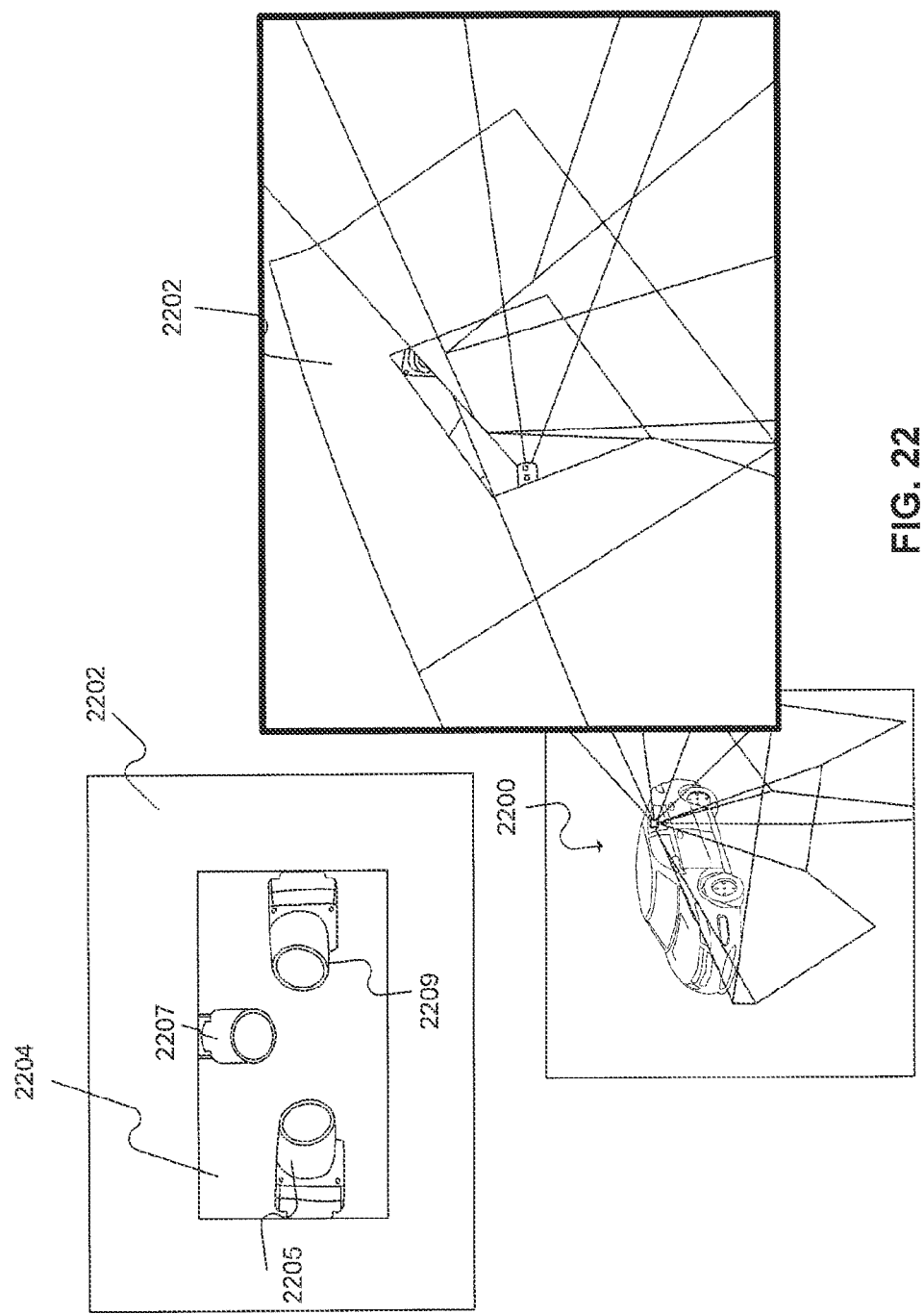
FIG. 22 is a perspective view of an exemplary vehicle including an imaging system consistent with the disclosed embodiments.

FIG. 21 is a side view representation of an exemplary imaging system 2200. FIG. 22 is a perspective illustration of imaging system 2200 consistent with the three camera embodiment of FIG. 10. As shown, imaging system 2200 is installed on the interior rear window of vehicle 99. In other embodiments, imaging system 220 may be installed in a front windshield of vehicle 99 in accordance with the principles of this disclosure. Imaging system 2200 may include a glare shield 2202 that surrounds a relatively smaller and transparent area 2204 that allows light to pass through the window to cameras 2205, 2207, and 2009. Glare shield 2202 may include a dark adhesive, a blackout paint, a tinting, a polarization, a printed or painted area for light exposure, or any combination of thereof. At least one advantage of glare shield 2202 is that may reduce the glare from the off incident light caused by the inclination (slope) of a windshield. The glare shield 2202 may surround a relatively smaller and transparent area 2204 is configured to provide an aperture to cameras 1005, 1007, and 1009, thereby increasing a depth of field of cameras 2205, 2207, and 2209 and enabling a plurality of disparate objects at a wide range of distances to remain in focus. In some embodiments, the relatively smaller and transparent area 2204 may be tinted or polarized.

Figure 23:
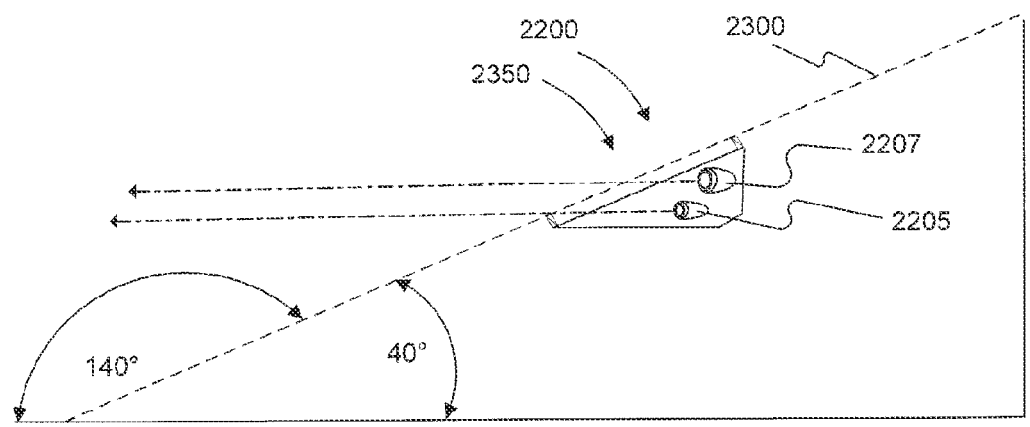
FIG. 23 is a side view of an exemplary vehicle including an imaging system consistent disclosed embodiments.

FIG. 23 is a side view representation of an exemplary imaging system 2200 that is located on a front windshield 2300. As illustrated front windshield 2300 has an inclination of 40° degrees relative to a straight horizontal surface, e.g., the ground. Although the example of FIG. 23 shows windshield 2300 with an inclination of 40° degrees, windshields with other inclinations (e.g., 35° degrees, 38° degrees, 42° degrees, 45° degrees, etc.) are consistent with the disclosed embodiments. In the exemplary embodiment, imaging system 2200 includes three cameras 2205, 2207, and 2209 (see FIG. 22) however only first camera 2205 and third camera 2207 are illustrated because in the side view illustration camera 2209 would be obscured by camera 2205. As illustrated cameras 2205 and 2207 are at different elevations. Therefore, the vector associated with each respective optical axis (illustrated by respective dashed lines) may not cross in the vertical plane. However, the vector associated with each respective optical axis (illustrated by respective dashed lines) may cross in the horizontal plane. Moreover, in some embodiments, as discussed earlier, imaging system 220 may include two cameras. In the exemplary embodiment, the imaging module 2350 is shaped to have an approximate inclination that is substantially equal to windshield 2300, e.g., about 40° degrees relative to a straight horizontal surface. In other embodiments, imaging module 2350 may be substantially rectangular and rely solely on mounting assembly (not labeled for ease of understanding) to account for the inclination of windshield 2300. Additionally, the mounting assembly (not labeled for ease of understanding) is configured to retain imaging module 2350 fixedly with respect to the window such that the cameras 2005, 2007, and 2009 project outward with respect to windshield 2300. Moreover, an optical axis (represented by dashed arrow) of cameras 2205, 2207, and 2209 may project outward parallel with the ground. In this way, the imaging module and mounting assembly may account for the inclination (slope) of a windshield. It should be understood that in this same way, imaging module and mounting assembly may account for other levels and types of inclination, e.g., horizontal, vertical, a combination of horizontal and vertical.

Figure 24:
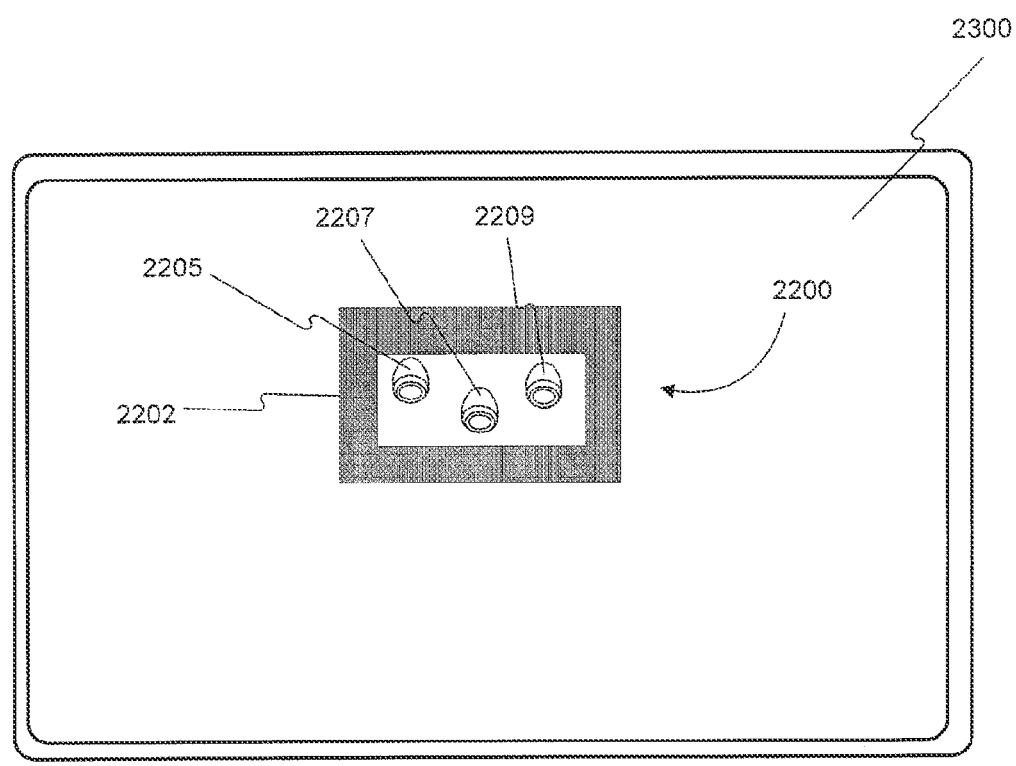
FIG. 24 is a diagrammatic plan view representation of FIG. 23 consistent with the disclosed embodiments.

FIG. 24 is a diagrammatic plan view representation of FIG. 23. In FIG. 24, three cameras are illustrated, i.e., first camera 2205, second camera 2209, and third camera 2207. As illustrated the three cameras 2205, 2209, and 2207 project outward through a relatively small and clear transparent area that is surrounded by a glare shield 2202. The glare shield is configured to provide an aperture to cameras 1005, 1007, and 1009, thereby increasing a depth of field of cameras 2205, 2207, and 2209 and enabling a plurality of disparate objects at a wide range of distances to remain in focus. In some embodiments, the relatively smaller and transparent area 2204 may be tinted or polarized.

In one embodiment, the first, second, and third cameras may use the same opening in the glare shield 2202. (e.g., FIG. 22). In other embodiments, each camera may have its own respective glare shield and corresponding clear area (not illustrated). In some examples, the opening in the printed or painted area that is used by the cameras may be equal or smaller than the area that would have been required by a camera having a field of view with similar characteristics as the combined FOV of the three (or more) cameras in the camera module.

In one embodiment, the third camera is, optionally, located between the first and the second cameras. Therefore, it should appreciated that since the side cameras (first and second cameras 2205, 2207) may combine to form a combined field of view greater than the field of view of third camera 2207 alone, it may be possible to use a slimmer lens in the third camera without hampering the performance of the camera module by taking advantage of the combined FOV. This may be particular advantageous because the third camera 2207, relative to the first and second cameras 2205, 2207, may be attached closer to the windshield (or window) of the vehicle. It will further be further appreciated that by having the central camera 2207 fitted more closely to the windshield, a greater field of view coverage may be obtained or supported with a smaller opening in the printed or painted are in the window.

Figure 25:
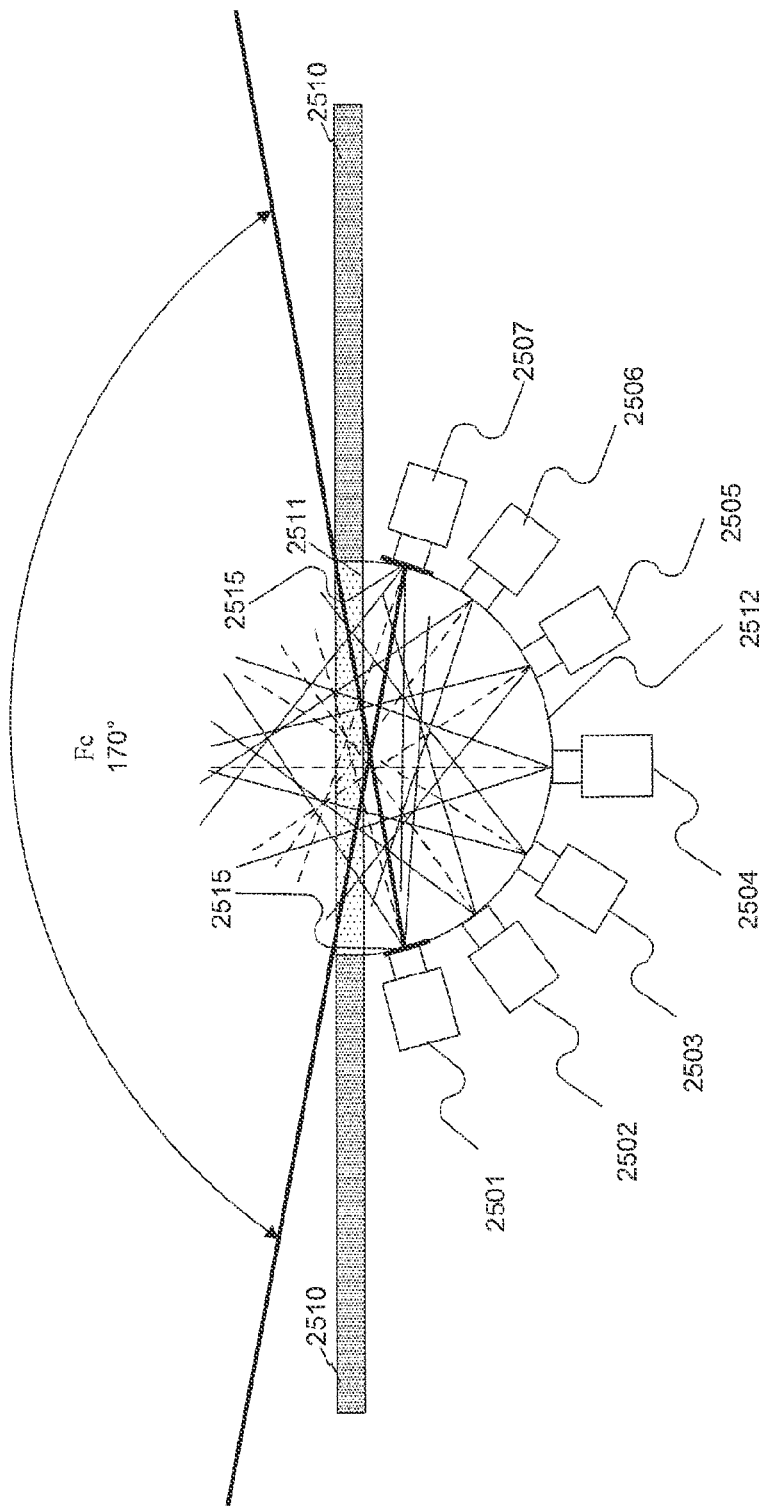
FIG. 25 is a diagrammatic plan view representation of an imaging system consistent with the disclosed embodiments.

FIG. 25 is a diagrammatic plan view representation of another embodiment consistent with the disclosure. In the exemplary embodiment, imaging module 2512 includes cameras arranged in the shape of a semi-circle having a radius that is coincident with relatively small and clear transparent area 2511. That is, in the exemplary embodiment, imaging module is configured to arrange a plurality of cameras 2501, 2502, 2503, 2504, 2505, 2506, and 2507 along an arc of a semi-circle. As illustrated, the cameras are oriented toward a radius of the semi-circle. Consistent with other disclosed embodiments, a mounting assembly (not illustrated) may be configured to attach imaging module 2511 to an interior window of the vehicle (or any other component) such that the cameras face outward with respect to the vehicle. In other embodiments in which the imaging module 2512 has an arcuate shape, the corresponding radius may not be located coincident with relatively small and clear transparent area 2511, e.g., it may be on either side. In the exemplary embodiment, there are seven cameras 2501, 2502, 2503, 2504, 2505, 2506, and 2507 oriented symmetrically although in other embodiments there may be more or less cameras. In some embodiments, the cameras may not be symmetrically spaced along an arc of the semi-circle.

In the exemplary embodiment, each respective camera 2501, 2502, 2503, 2504, 2505, 2506, and 2507 has a respective field of view (represented by corresponding triangular regions) and a respective optical axis (represented by corresponding dashed lines) that project outward of a single relatively small and transparent opening 2511. In the exemplary embodiment, the combined field of view $F_c$ is 170° degrees, although in other embodiments it could be more or less e.g., within a range of about 100° degrees to 180° degrees. As illustrated, each camera 2501, 2502, 2503, 2504, 2505, 2506, and 2507 has a relatively narrow field of view when compared to the combined field of view $F_c$.

As illustrated, each respective field of view overlaps, at least, partially, with the radius of the semi-circle and the radius of the semi-circle is located at a central location of the single relatively small and transparent opening 2511. Additionally, each respective optical axis (represented by corresponding dashed lines) crosses every other respective optical axis in at least one respective crossing point of a respective crossing plane (not illustrated for ease of understanding) as is consistent with the above disclosure (see FIG. 10). In this way, each crossing of two optical axes corresponds to a respective crossing point of a respective crossing plane. In the exemplary embodiment, each respective optical axis crosses every other respective optical axis in at least a horizontal plane. In other embodiments, each respective optical axis crosses every other respective optical axis in at least a vertical plane. In other embodiments still, each respective optical axis crosses every other respective optical axis in both the horizontal plane and the vertical plane.

In the exemplary embodiment, the relatively smaller and transparent area 2511 is configured to provide an aperture to each of cameras 2501, 2502, 2503, 2504, 2505, 2506, and 2507 thereby increasing a depth of field of each of cameras 2501, 2502, 2503, 2504, 2505, 2506, and 2507 and enabling a plurality of disparate objects at a wide range of distances to remain in focus. Furthermore, the relatively smaller and transparent area 2511 is smaller than a comparative transparent area that would be required by a wide angle camera having a wide angle field of view substantially equal to the combined field of view $F_c$. In some embodiments, the combined field of view may be on the order of at least 180 degrees forward of a vehicle 99. As shown, clear transparent area 2511 may be delineated by component 2510 as a boundary. Component 2510 may be a solid feature such as a vehicle component, e.g., a pillar, a bumper, a door panel, a headlight, a side window, a front window, etc.

In the exemplary embodiment, each of cameras 2501, 2502, 2503, 2504, 2505, 2506, and 2507 are spaced apart from at least one immediately adjacent camera 2501, 2502, 2503, 2504, 2505, 2506, or 2507 of the plurality of cameras by equal distance. In other embodiments, 2501, 2502, 2503, 2504, 2505, 2506, and 2507 are not spaced apart by equal distances. In the exemplary embodiment, each respective crossing point of each respective crossing plane is located apart from a nearest camera by at least the equal distance between immediately adjacent cameras. As illustrated, each respective crossing point of each respective crossing plane is located apart from a nearest camera by at most four times the equal distance between immediately adjacent cameras. In other embodiments, each respective crossing point of each respective crossing plane is located apart from a nearest camera by at most six times the equal distance between immediately adjacent cameras.

In the exemplary embodiment, the cameras with the greatest angle of repose between their corresponding optical axis and the relatively small and clear transparent area 2511 may have polarizing filters 2515. Polarizing filters 2515 may assist with filtering out or avoiding reflections of off incident light that is refracted by the relatively small and transparent opening 2511. Furthermore, by using multiple cameras the polarizing filters 2515 may be attached to only those cameras that are most affected. Additionally, because the exemplary embodiment has multiple cameras 2501, 2502, 2503, 2504, 2505, 2506, and 2507, an exposure level of each camera can be optimized for that particular camera. Furthermore, glare due to the sun hitting the lens of one particular camera may not affect the image from the other cameras. In this way, the multiple cameras 2501, 2502, 2503, 2504, 2505, 2506, and 2507 may be configured to provide redundancy in image quality and otherwise hedge against the likelihood of poor exposure.

In at least one embodiment, seven VGA resolution camera cubes of about 2 mm are spaced apart from each other along an arc of a semi-circle as illustrated by FIG. 25. According to this embodiment, the semicircle corresponds to a circle having a diameter of about 10 mm. At least one advantage of this embodiment is that it results in a very compact high resolution combined field of view.

In a similar but alternate embodiment, a plurality of cameras may be mounted in a hemisphere with a first ring of 12 cameras located proximate to a relatively small and transparent hemispherical opening. In this embodiment, each of the 12 cameras of the first ring may have a polarizing filter. Additionally, a second ring of 8 cameras, a third ring of 4 cameras, and a central camera may be included.

Those of ordinary skill in the art will appreciate that image processing techniques may be used to combine the field of view of two or more cameras to provide a combined field of view as may be consistent with the disclosure herein. For example, at least one processing device (e.g., processing unit 110) may execute program instructions to provide a combined field of view and/or to analyze one or more images captured by the two or more cameras. If the respective field of views of the two or more cameras are partially overlapping, any resultant combined field of view can include the overlapping areas of the field of view of the two or more cameras and non-overlapping areas of any one of the two or more cameras. Cropping can be used to reduce or prevent redundancy in imaging techniques consistent with this disclosure.

Those of ordinary skill in the art will also appreciate that the disclosed embodiments may be positioned anywhere within or on a host vehicle and are not necessarily limited to autonomous vehicles. Further, in some embodiments, multiple imaging systems may be installed on vehicle 99. For example, a first imaging system may be installed on a right side rear window, a second imaging system may be installed on a left side rear window, a third imaging system may be installed on a rear back window, and a fourth imaging system may be installed on a front windshield. According to this embodiment, the multiple imaging systems may combine to form a totally panoramic combined field of view surrounding vehicle 99.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An apparatus comprising:
   at least one processor;
   a first camera coupled to the at least one processor, the first camera having a first lens with a first field of view and a first angle;
   a second camera coupled to the at least one processor, the second camera having a second lens with a second field of view and a second angle, the second field of view being different from the first field of view, the first angle being wider than the second angle; and
   a mounting assembly configured to attach the apparatus to an interior window of a vehicle,
   wherein:
      when the apparatus is mounted with the mounting assembly, the first field of view and the second field of view at least partially overlap, and the first field of view is substantially perpendicular to a central longitudinal axis of the vehicle,
      the first camera has a first optical axis,
      the second camera has a second optical axis, and
      the first optical axis crosses the second optical axis in at least one crossing point of a crossing plane.

2. The apparatus of claim 1, wherein the mounting assembly is configured to attach the apparatus to an interior rear window.

3. The apparatus of claim 1, wherein the first camera is focused at a first horizontal distance beyond the at least one crossing point of the crossing plane and the second camera is focused at a second horizontal distance beyond the at least one crossing point of the crossing plane.

4. The apparatus of claim 3, wherein the first camera is closer to the at least one crossing point than the second camera.

5. The apparatus of claim 1, wherein the mounting assembly is configured to position the first camera and the second camera at the same height.

6. The apparatus of claim 1, wherein the second field of view is offset from the central longitudinal axis by a range between 5 to 30 degrees measured from the rear of the vehicle.

7. The apparatus of claim 6, wherein the first field of view and the second field of view have a combined field of view ranging from 90 to 175 degrees.

8. The apparatus of claim 7, wherein:
the first angle is substantially 100 degrees;
the second angle is substantially 50 degrees;
the combined field of view is substantially 130 degrees;
the first field of view and the second field of view overlap by at least 20 degrees; and
the offset from the central longitudinal axis is substantially 5 degrees.

9. The apparatus of claim 1, wherein the first field of view is offset from the central longitudinal axis by substantially 60 degrees measured from the front of the vehicle.

10. The apparatus of claim 1, further comprising a third camera coupled to the at least one processor,
wherein:
the third camera has a third lens with a third field of view and the second angle;
the third field of view at least partially overlap with the second field of view; and
the first field of view, the second field of view, and the third field of view form a combined field of view of at least 160 degrees.

11. An imaging system for a vehicle, the system comprising:
a processing unit;
a first camera coupled to the processing unit, the first camera having a first lens with a first field of view and a first angle;
a second camera coupled to the processing unit, the second camera having a second lens with a second field of view and a second angle, the second field of view being different from the first field of view, the first angle being wider than the second angle;
a third camera coupled to the processing unit, the third camera having a third lends with a third field of view, the third field of view being different from the first field of view and the second field of view; and
a mounting assembly configured to attach the first camera, the second camera, and the third camera to an interior window of a vehicle,
wherein:
the first field of view and the second field of view at least partially overlap, the first field of view and the third field of view at least partially overlap, and the first field of view is substantially perpendicular to a central longitudinal axis of the vehicle,
the first camera has a first optical axis,
the second camera has a second optical axis, and
the first optical axis crosses the second optical axis in at least a first crossing point of a crossing plane.

12. The system of claim 11, wherein the mounting assembly is configured to attach the first camera, the second camera, and the third camera to an interior rear window of a vehicle.

13. The system of claim 11, wherein:
the third camera has a third optical axis; and
the first optical axis crosses the third optical axis in at least a second crossing point of a crossing plane.

14. The system of claim 13, wherein:
the first camera is focused at a first horizontal distance beyond the first crossing point and the second camera is focused at a second horizontal distance beyond the second crossing point; and
the first crossing point is different from the second crossing point.

15. The system of claim 13, wherein
the first camera is closer to the first crossing point than the second camera; and
the first camera is closer to the second crossing point than the third camera.

16. The system of claim 11, wherein the mounting assembly is configured to position:
the first camera at a different height from the second camera;
the first camera at a different height from the third camera; and
the second camera at a different height from the third camera.

17. The system of claim 11, wherein the second field of view is offset from the central longitudinal axis by a range between 5 to 30 degrees measured from the rear of the vehicle.

18. The system of claim 17, wherein:
the first field of view is offset from the central longitudinal axis by substantially 60 degrees measured from the front of the vehicle; and
the third field of view is offset from the central longitudinal axis by a range between 5 to 30 degrees measured from the front of the vehicle.

19. An imaging system for a vehicle comprising:
at least one processor;
a first camera coupled to the at least one processor, the first camera having a first lens with a first field of view and a first angle;
a second camera coupled to the at least one processor, the second camera having a second lens with a second field of view and a second angle, the second field of view being different from the first field of view, the first angle being wider than the second angle; and
a mounting assembly configured to attach the at least a portion of the imaging system to an interior window of a vehicle,
wherein:
the first field of view is substantially perpendicular to a central longitudinal axis of the vehicle;
the at least one processor is configured to:
receive a first plurality of images from the first camera and a second plurality of images from the second camera;
perform stereo image analysis of the first plurality of images and the second plurality of images to create a 3D map; and
cause one or more navigational responses in the vehicle based on the stereo image analysis, the navigation responses comprising at least one of a turn, a change in acceleration, a change in velocity, or braking;
the first camera has a first optical axis;
the second camera has a second optical axis; and
the first optical axis crosses the second optical axis in at least one crossing point of a crossing plane.

20. An apparatus comprising:
at least one data interface;
a first camera coupled to the at least one data interface, the first camera having a first lens with a first field of view and a first angle;
a second camera coupled to the at least one data interface, the second camera having a second lens with a second field of view and a second angle, the second field of view being different from the first field of view, the first angle being wider than the second angle; and
a mounting assembly configured to attach the apparatus to an interior window of a vehicle,
wherein:
 when the apparatus is mounted with the mounting assembly, the first field of view and the second field of view at least partially overlap, and the first field of view is substantially perpendicular to a central longitudinal axis of the vehicle,
 the first camera has a first optical axis;
 the second camera has a second optical axis; and
 the first optical axis crosses the second optical axis in at least one crossing point of a crossing plane.

21. The apparatus of claim 20, wherein the first camera is focused at a first horizontal distance beyond the at least one crossing point of the crossing plane and the second camera is focused at a second horizontal distance beyond the at least one crossing point of the crossing plane.

22. The apparatus of claim 20, wherein the second field of view is offset from the central longitudinal axis by a range between 5 to 30 degrees measured from the rear of the vehicle.

23. The apparatus of claim 20, wherein the first field of view is offset from the central longitudinal axis by substantially 60 degrees measured from the front of the vehicle.

24. The apparatus of claim 20, further comprising a third camera coupled to the at least one data interface,
wherein:
 the third camera has a third lens with a third field of view and the second angle;
 the third field of view at least partially overlap with the second field of view; and
 the first field of view, the second field of view, and the third field of view form a combined field of view of at least 160 degrees.

* * * * *